United States Patent
Cho et al.

(10) Patent No.: US 12,130,496 B2
(45) Date of Patent: Oct. 29, 2024

(54) CAMERA AND TERMINAL INCLUDING THE SAME CAPABLE OF CHANGING FOCUS USING MICRO MIRROR ARRAY

(71) Applicant: LG ELECTRONICS INC., Seoul (KR)

(72) Inventors: Sunho Cho, Seoul (KR); Kwanhyung Kim, Seoul (KR); Dongryeol Lee, Seoul (KR); Hyungjoo Kang, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 897 days.

(21) Appl. No.: 17/056,915

(22) PCT Filed: May 20, 2019

(86) PCT No.: PCT/KR2019/006026
§ 371 (c)(1),
(2) Date: Nov. 19, 2020

(87) PCT Pub. No.: WO2019/225928
PCT Pub. Date: Nov. 28, 2019

(65) Prior Publication Data
US 2021/0208487 A1 Jul. 8, 2021

(30) Foreign Application Priority Data

May 21, 2018 (KR) .................. 10-2018-0057935
Nov. 9, 2018 (KR) .................. 10-2018-0137511

(51) Int. Cl.
*G02B 7/182* (2021.01)
*G02B 7/18* (2021.01)
(Continued)

(52) U.S. Cl.
CPC ......... *G02B 7/1821* (2013.01); *G02B 7/1805* (2013.01); *G02B 27/646* (2013.01);
(Continued)

(58) Field of Classification Search
CPC .... G02B 27/64; G02B 27/646; G02B 7/1805; G02B 7/1821; G03B 2205/0023;
(Continued)

(56) References Cited

U.S. PATENT DOCUMENTS 5,062,696 A * 11/1991 Oshima .............. H04N 23/6842
348/208.99
5,523,887 A * 6/1996 Wight .................. G02B 27/646
359/554
(Continued)

FOREIGN PATENT DOCUMENTS

KR 10-2004-0049045 6/2004
KR 10-2008-0037059 4/2008
(Continued)

OTHER PUBLICATIONS

Olympus OM-D E-M1 Mark II Instruction Manual (Year: 2016).*
(Continued)

*Primary Examiner* — Bao-Luan Q Le
(74) *Attorney, Agent, or Firm* — LEE, HONG, DEGERMAN, KANG & WAIMEY

(57) ABSTRACT

The present invention relates to a camera and a terminal comprising same. A camera and a terminal comprising same according to an embodiment of the present invention comprise: a lens device including a micromirror array; and a processor for outputting, to the micromirror array in the lens device, a curvature control signal for curvature change, wherein the micromirror array includes a plurality of micromirrors including a first micromirror and a second micromirror, and the second micromirror is closer to the outer (Continued)

periphery thereof than the first micromirror and has a larger tilting angle according to the control signal than the first micromirror. Accordingly, focus can be changed using the micromirror array.

18 Claims, 28 Drawing Sheets

(51) Int. Cl.
    *G02B 27/64*     (2006.01)
    *G03B 17/17*     (2021.01)
    *H04M 1/02*     (2006.01)
    *G03B 13/36*     (2021.01)

(52) U.S. Cl.
    CPC .......... *G03B 17/17* (2013.01); *H04M 1/0264* (2013.01); *G03B 13/36* (2013.01); *G03B 2205/0007* (2013.01)

(58) Field of Classification Search
    CPC ...... G03B 2205/003; G03B 2205/0007; G03B 17/17; H04N 23/686; H04N 23/687; H04N 23/685; H04M 1/0264
    See application file for complete search history.

(56) References Cited

U.S. PATENT DOCUMENTS

| | | | | |
|---|---|---|---|---|
| 5,526,045 | A * | 6/1996 | Oshima | H04N 23/687 |
| | | | | 348/E3.02 |
| 10,571,093 | B2 * | 2/2020 | Park | F21V 7/0025 |
| 2004/0012683 | A1 * | 1/2004 | Yamasaki | H04N 23/686 |
| | | | | 348/208.1 |
| 2004/0141065 | A1 * | 7/2004 | Hara | H04N 23/687 |
| | | | | 348/208.11 |
| 2005/0263682 | A1 | 12/2005 | Eikenberry | |
| 2006/0018651 | A1 * | 1/2006 | Cho | G02B 26/0833 |
| | | | | 396/111 |
| 2006/0187335 | A1 * | 8/2006 | Ohtsuka | H04N 23/68 |
| | | | | 348/E5.046 |
| 2006/0209423 | A1 * | 9/2006 | Kim | G02B 26/0833 |
| | | | | 359/676 |
| 2006/0245067 | A1 * | 11/2006 | Sohn | G02B 26/0833 |
| | | | | 359/626 |
| 2006/0268431 | A1 * | 11/2006 | Jin | G02B 27/646 |
| | | | | 359/726 |
| 2007/0040924 | A1 * | 2/2007 | Cho | G03B 35/02 |
| | | | | 348/335 |
| 2007/0188618 | A1 * | 8/2007 | Chang | H04N 23/687 |
| | | | | 348/208.99 |
| 2017/0294476 | A1 * | 10/2017 | Hu | G02B 7/1805 |
| 2018/0024329 | A1 * | 1/2018 | Goldenberg | H04N 23/45 |
| 2018/0109660 | A1 * | 4/2018 | Yoon | H04N 23/687 |
| 2018/0136438 | A1 * | 5/2018 | Ho | G03B 5/00 |
| 2018/0203328 | A1 * | 7/2018 | Kang | G03B 13/36 |
| 2018/0224088 | A1 * | 8/2018 | Park | F21V 7/0066 |
| 2018/0224665 | A1 * | 8/2018 | Im | G02B 7/08 |

FOREIGN PATENT DOCUMENTS

| | | |
|---|---|---|
| KR | 10-2017-0105236 | 9/2017 |
| KR | 1020180003539 | 1/2018 |
| KR | 10-2018-0046624 | 5/2018 |

OTHER PUBLICATIONS

Korean Intellectual Property Office Application No. 10-2018-0137511, Office Action dated Mar. 4, 2023, 5 pages.
PCT International Application No. PCT/KR2019/006026, International Search Report dated Sep. 17, 2019, 6 pages.

* cited by examiner

CAMERA AND TERMINAL INCLUDING THE SAME CAPABLE OF CHANGING FOCUS USING MICRO MIRROR ARRAY

CROSS-REFERENCE TO RELATED APPLICATIONS

This application is the National Stage filing under 35 U.S.C. 371 of International Application No. PCT/KR2019/006026, filed on May 20, 2019, which claims the benefit of earlier filing date and right of priority to Korean Application Nos. 10-2018-0057935, filed on May 21, 2018 and 10-2018-0137511, filed on Nov. 9, 2018, the contents of which are all hereby incorporated by reference herein their entirety.

BACKGROUND

1. Field

The present disclosure relates to a camera and a terminal including the same and, more particularly, to a camera and a terminal including the same which may vary a focus using a micro mirror array.

2. Related Art

A camera is an apparatus for photographing an image. Recently, as the camera has been installed in a mobile terminal, researches on miniaturizing a camera has been conducted.

Meanwhile, along with the trend of a miniaturized camera, an autofocusing function and an image stabilization function are increasingly employed.

Particularly, for the autofocusing function, a lens structure including a plurality of lenses is used.

SUMMARY

The present disclosure provides a camera and a terminal including the same which may vary a focus using a micro mirror array.

The present disclosure also provides a camera and a terminal including the same which may implement a hand tremor compensation for a dual prism.

The present disclosure also provides a camera and a terminal including the same which may implement a hand tremor compensation by driving a rotation of a dual prism independently.

The present disclosure also provides a camera and a terminal including the same which is provided with a dual prism.

In an aspect, a camera and a terminal including the same according to an embodiment of the present disclosure includes a processor configured to output a curvature control signal for a curvature variation to the micro mirror array in the lens structure, wherein the micro mirror array includes a plurality of micro mirrors, and wherein a first tilting angle of a first micro mirror and a second tilting angle of a second micro mirror among the plurality of micro mirrors are changed based on the curvature control signal, wherein the second micro mirror is closer to an outside than the first micro mirror, and the second tilting angle is greater than the first tilting angle.

Meanwhile, the plurality of micro mirrors may be arranged in a plurality of concentric circles.

Meanwhile, the processor may be configured to: output a first curvature control signal to the micro mirror array at a first time to form a first focus, and output a second curvature control signal to the micro mirror array at a second time after the first time to form a second focus.

Meanwhile, when the tilting angle of the micro mirror array is greater at the second time than the tilting angle of the micro mirror array at the first time, wherein the second focus may be formed closer than the first focus.

Meanwhile, the camera and the terminal including the same according to an embodiment of the present disclosure may further include a first prism for reflecting incident light in a first reflection direction; and a first actuator for changing the first reflection direction by changing an angle of the first prism around a first rotation axis based on a first control signal which is input.

Meanwhile, the camera and the terminal including the same according to an embodiment of the present disclosure may further include a second prism for reflecting the light reflected from the first prism in a second reflection direction; and a second actuator for changing the second reflection direction by changing an angle of the second prism around a second rotation axis based on a second control signal which is input.

Meanwhile, the first prism includes a first internal reflection surface and the second prism includes a second internal reflection surface.

Meanwhile, the first prism receives an incident light through a first incident prism surface and outputs a reflected incident light from the first internal reflection surface through a first output prism surface, and the second prism receives a reflected incident light through a second incident prism surface and outputs a reflected light reflected from the second internal reflection surface.

Meanwhile, a first output prism surface of the first prism may face a second incident prism surface of the second prism.

Meanwhile, the first rotation axis of the first prism may be orthogonal to the second rotation axis of the second prism.

Meanwhile, in response to a movement causing rotation of the first prism around the first rotation axis by a first angle and rotation of the second prism around the second rotation axis by a second angle, the first actuator is configured to rotate the first prism in a third direction opposite to the first direction by a third angle in response to the first control signal, the second actuator is configured to rotate the second prism a fourth direction opposite to the second direction by a fourth angle in response to the second control signal, wherein the third angle is a half of the first angle, and wherein the fourth angle is a half of the second angle.

Meanwhile, the camera and the terminal including the same according to an embodiment of the present disclosure may further include a first Hall sensor for detecting an angle change of the first prism based on first magnetic field, and a second Hall sensor for detecting an angle change of the first prism based on second magnetic field.

Meanwhile, the first actuator includes a first driving magnet and a first driving coil.

Meanwhile, the camera and the terminal including the same according to an embodiment of the present disclosure may further include a first prism holder for fixing the first prism; a first yoke coupled to a rear side of the first prism holder; a first driving magnet coupled to a rear side of the first yoke; and a plurality of protrusions protruded toward the first prism holder, wherein each of the protrusions includes an opening portion, and wherein the opening portion includes a first coil holder for limiting the first rotation axis, wherein a first driving coil is disposed between the first coil holder and the first yoke, and wherein the first prism holder includes a plurality of bosses coupled with an opening of a plurality of protrusions so as to rotate the first prism around the first rotation axis.

Meanwhile, the second actuator includes a second driving magnet and a second driving coil.

Meanwhile, the camera and the terminal including the same according to an embodiment of the present disclosure may further include a second prism holder for fixing the second prism; a second yoke coupled to a rear side of the second prism holder; a second driving magnet coupled to a rear side of the second yoke; and a plurality of protrusions protruded toward the second prism holder, wherein each of the protrusions includes an opening portion, and wherein the opening portion includes a second coil holder for limiting the second rotation axis, wherein a second driving coil is disposed between the second coil holder and the second yoke, and wherein the second prism holder includes a plurality of bosses coupled with an opening of a plurality of protrusions so as to rotate the second prism around the second rotation axis.

In another aspect, a processor in a camera and a terminal including the same according to an embodiment of the present disclosure may be controlled to output a third image that synthesizes a first image based on a first focus obtained from the camera at a first time and a second image based on a second focus obtained from the camera at a second time.

Advantageous Effects

In an aspect, a camera and a terminal including the same according to an embodiment of the present disclosure includes a processor configured to output a curvature control signal for a curvature variation to the micro mirror array in the lens structure, wherein the micro mirror array includes a plurality of micro mirrors, and wherein a first tilting angle of a first micro mirror and a second tilting angle of a second micro mirror among the plurality of micro mirrors are changed based on the curvature control signal, wherein the second micro mirror is closer to an outside than the first micro mirror, and the second tilting angle is greater than the first tilting angle. Accordingly, a focus may be varied using the micro mirror array. Therefore, it is available to implement a slim camera.

Meanwhile, the plurality of micro mirrors may be arranged in a plurality of concentric circles. Accordingly, a focus may be varied using the micro mirror array.

Meanwhile, the processor may be configured to: output a first curvature control signal to the micro mirror array at a first time to form a first focus, and output a second curvature control signal to the micro mirror array at a second time after the first time to form a second focus. Accordingly, a focus may be varied continuously using the micro mirror array.

Meanwhile, when the tilting angle of the micro mirror array is greater at the second time than the tilting angle of the micro mirror array at the first time, wherein the second focus may be formed closer than the first focus. Accordingly, a focus may be varied continuously using the micro mirror array.

Meanwhile, the camera and the terminal including the same according to an embodiment of the present disclosure may further include a first prism for reflecting incident light in a first reflection direction; and a first actuator for changing the first reflection direction by changing an angle of the first prism around a first rotation axis based on a first control signal which is input. Accordingly, a hand tremor compensation may be implemented for the first prism.

Meanwhile, the camera and the terminal including the same according to an embodiment of the present disclosure may further include a second prism for reflecting the light reflected from the first prism in a second reflection direction; and a second actuator for changing the second reflection direction by changing an angle of the second prism around a second rotation axis based on a second control signal which is input. Accordingly, a hand tremor compensation may be implemented for the dual prism. Particularly, a rotation of the dual prism may be driven independently, and a hand tremor compensation may be implemented based on a plurality of rotational axes.

Meanwhile, the first rotation axis of the first prism may be orthogonal to the second rotation axis of the second prism. Accordingly, since optical paths of the first prism and the second prism are different, an implementation of L-shaped camera is available, and therefore, a slim camera of which thickness becomes thinner may be implemented.

Meanwhile, in response to a movement causing rotation of the first prism around the first rotation axis by a first angle and rotation of the second prism around the second rotation axis by a second angle, the first actuator is configured to rotate the first prism in a third direction opposite to the first direction by a third angle in response to the first control signal, the second actuator is configured to rotate the second prism a fourth direction opposite to the second direction by a fourth angle in response to the second control signal, wherein the third angle is a half of the first angle, and wherein the fourth angle is a half of the second angle. Accordingly, a compensation angle becomes decreased in a hand tremor compensation, and an accuracy in the hand tremor compensation may be improved. Meanwhile, the camera and the terminal including the same according to an embodiment of the present disclosure may further include a first Hall sensor for detecting an angle change of the first prism based on first magnetic field, and a second Hall sensor for detecting an angle change of the first prism based on second magnetic field. Accordingly, a hand tremor compensation may be implemented for the dual prism.

Meanwhile, the first actuator includes a first driving magnet and a first driving coil. Accordingly, a hand tremor compensation for the first prism may be implemented.

Meanwhile, the camera and the terminal including the same according to an embodiment of the present disclosure may further include a first prism holder for fixing the first prism; a first yoke coupled to a rear side of the first prism holder; a first driving magnet coupled to a rear side of the first yoke; and a plurality of protrusions protruded toward the first prism holder, wherein each of the protrusions includes an opening portion, and wherein the opening portion includes a first coil holder for limiting the first rotation axis, wherein a first driving coil is disposed between the first coil holder and the first yoke, and wherein the first prism holder includes a plurality of bosses coupled with an opening of a plurality of protrusions so as to rotate the first prism around the first rotation axis. Accordingly, the first driving magnet, the first prism holder and the first prism may be rotated around the first rotation axis.

Meanwhile, the second actuator includes a second driving magnet and a second driving coil. Accordingly, a hand tremor compensation for the second prism may be implemented.

Meanwhile, the camera and the terminal including the same according to an embodiment of the present disclosure may further include a second prism holder for fixing the second prism; a second yoke coupled to a rear side of the second prism holder; a second driving magnet coupled to a rear side of the second yoke; and a plurality of protrusions protruded toward the second prism holder, wherein each of the protrusions includes an opening portion, and wherein the opening portion includes a second coil holder for limiting the second rotation axis, wherein a second driving coil is disposed between the second coil holder and the second yoke, and wherein the second prism holder includes a plurality of bosses coupled with an opening of a plurality of protrusions so as to rotate the second prism around the second rotation axis. Accordingly, the second driving magnet, the second prism holder and the second prism may be rotated around the second rotation axis. Meanwhile, the refractive indices of the first prism and the second prism may be 1.7 or greater. Accordingly, total reflection may be performed in the first prism and the second prism, and consequently, light may be transferred to the image sensor direction.

Meanwhile, the refractive indices of the first prism and the second prism may be less than 1.7, and reflective coatings may be formed on the reflection surfaces of the respective first prism and the second prism. Accordingly, total reflection may be performed in the first prism and the second prism, and consequently, light may be transferred to the image sensor direction.

Meanwhile, the camera and the terminal including the same according to an embodiment of the present disclosure may further include a driving processor for generating a first control signal and a second control signal for stabilizing an image captured by an image sensor. The first control signal is based on an angle change of the first prism induced by a movement, and the second control signal is based on an angle change of the second prism induced by a movement. Accordingly, accurate hand tremor compensation may be implemented by a closed loop control of the driving processor.

Meanwhile, a processor in a camera and a terminal including the same according to an embodiment of the present disclosure may be controlled to output a third image that synthesizes a first image based on a first focus obtained from the camera at a first time and a second image based on a second focus obtained from the camera at a second time. Accordingly, an image having various focuses may be displayed simultaneously.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EMBODIMENTS

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
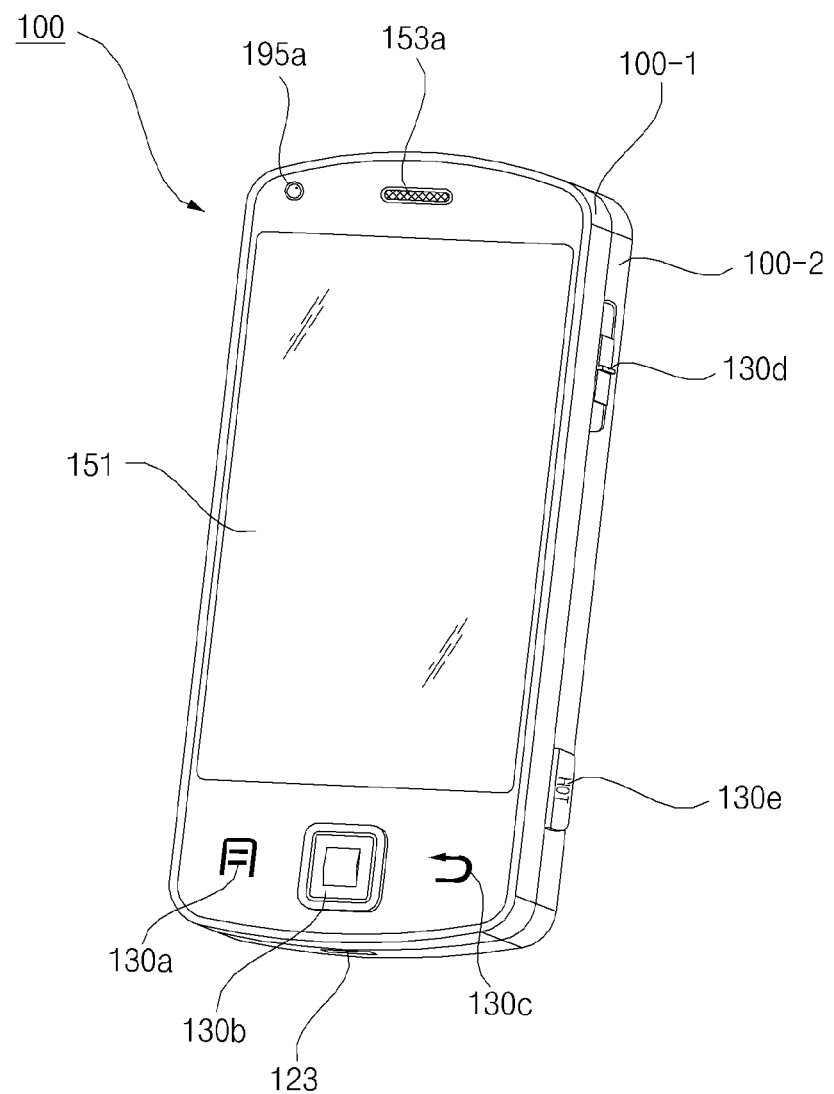
FIG. 1A is a perspective view of a mobile terminal as an example of an image display apparatus according to an embodiment of the present invention.
Figure 1B:
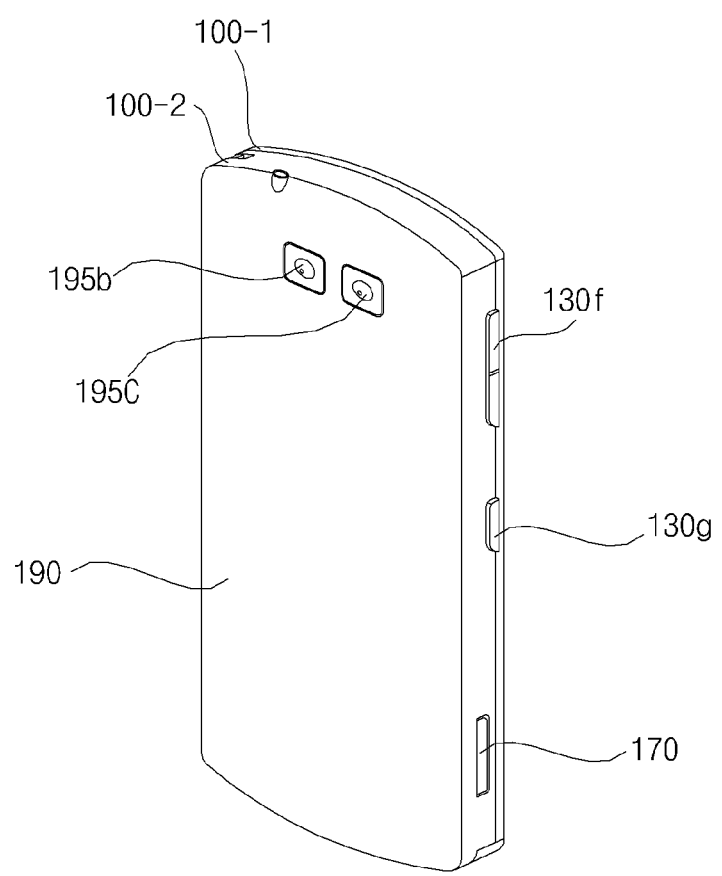
FIG. 1B is a rear perspective view of the mobile terminal shown in FIG. 1A.

FIG. 1A is a perspective view of a mobile terminal as an example of an image display apparatus according to an embodiment of the present invention, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input units 130a, 130b, and 130c may be disposed in the front case 100-1. Further, a fourth user input unit 130d, a fifth user input unit 130e, and a first to third microphones 123a, 123b, and 123c may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and the sixth and seventh user input units 130f and 130g described below may be collectively referred to as a user input unit 130.

The first microphone 123a and the second microphone 123b may be disposed in the upper side of the rear case 100-2, i.e., in the upper side of the mobile terminal 100, so as to collect an audio signal, and the third microphone 123c may be disposed in the lower side of the rear case 100-2, i.e., in the lower side of the mobile terminal 100, so as to collect an audio signal Referring to FIG. 1B, a second camera 195b, a third camera 195c, and a fourth microphone 123d may be additionally mounted on the rear surface of the rear case 100-2, and a sixth and seventh user input units 130f and 130g, and an interface 175 may be disposed on the side surface of the rear case 100-2.

The second camera 195b has a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

The second camera 195b may have a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for photographing a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The fourth microphone 123d may be disposed in the front surface of the rear case 100-2, i.e., in the rear surface of the mobile terminal 100 so as to collect an audio signal.

Figure 2:
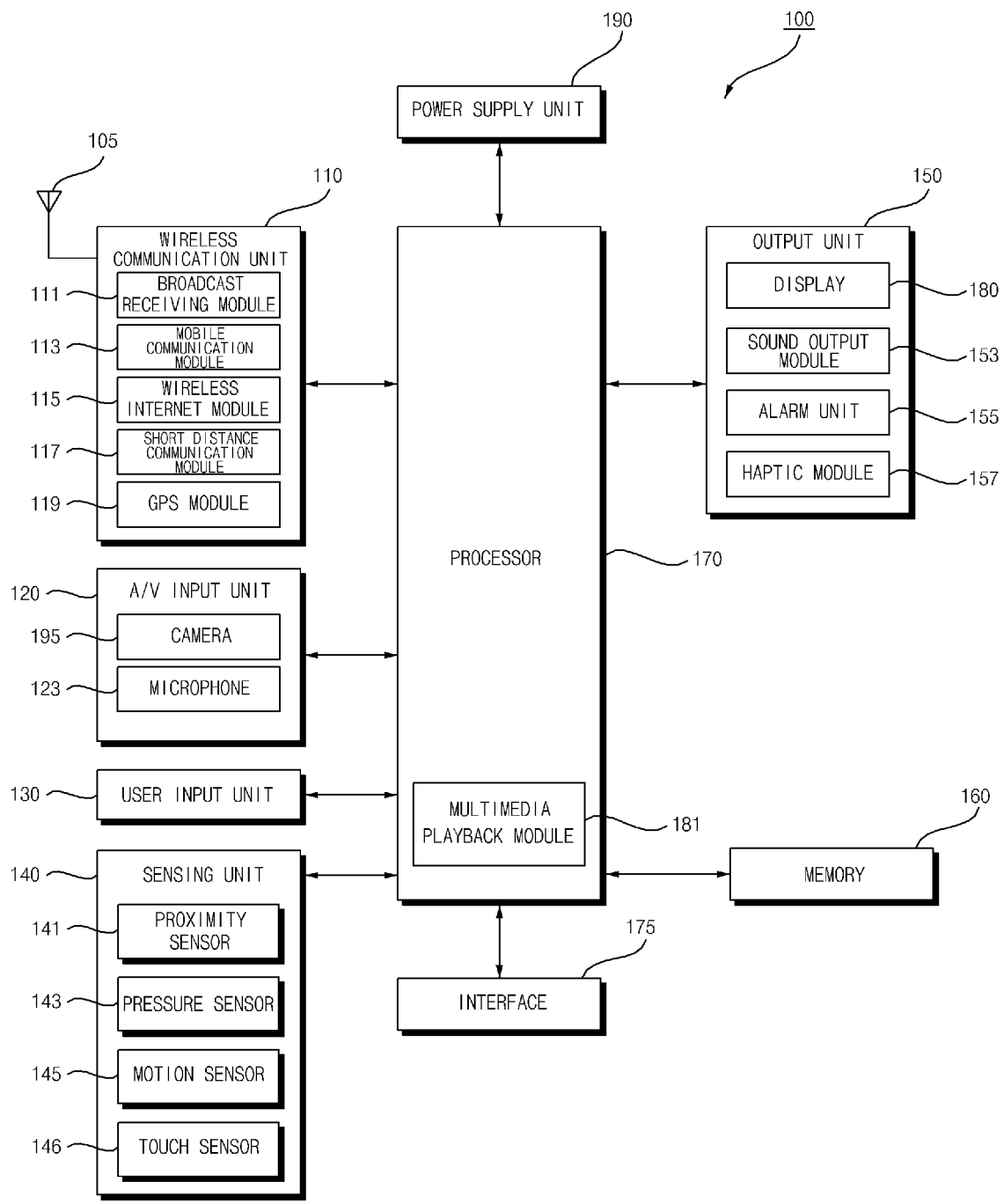
FIG. 2 is a block diagram of the mobile terminal of FIG. 1.

FIG. 2 is a block diagram of the mobile terminal of FIG. 1.

Referring to FIG. 2, the mobile terminal 100 may include a wireless communication unit 110, an audio/video (A/V) input unit 120, a user input unit 130, a sensing unit 140, an output unit 150, a memory 160, an interface 175, a processor 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short-range communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short-range communication module 117 refers to a module for short-range communication. Bluetooth, Radio Frequency Identification (RFID), infrared Data Association (IrDA), Ultra Wideband (UWB), ZigBee, and Near Field Communication (NFC) may be used as a short-range communication technology.

The Global Position System (GPS) module 119 may receive position information from a plurality of GPS satellites.

The audio/video (A/V) input unit 120 may be used to input an audio signal or a video signal, and may include the camera 195, the microphone 123, and the like.

The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the processor 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position, movement or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the processor 170.

The output unit 150 may be used to output an audio signal, a video signal, or an alarm signal. The output unit 150 may include a display 180, a sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the processor 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The processor 170 may control, in general, the operation of each unit to control the overall operation of the mobile terminal 100. For example, the processor 170 may perform relevant control and processing for voice call, data communication, video call, and the like. In addition, the processor 170 may include a multimedia play module 181 for playing multimedia. The multimedia play module 181 may be configured in hardware inside the processor 170 or may be configured in software separately from the processor 170. Meanwhile, the processor 170 may include an application processor (not shown) for driving an application. Alternatively, the application processor (not shown) may be provided separately from the processor 170.

The power supply unit 190 may receive external power or internal power under the control of the processor 170 to supply power required for operation of each component.

Figure 3A:
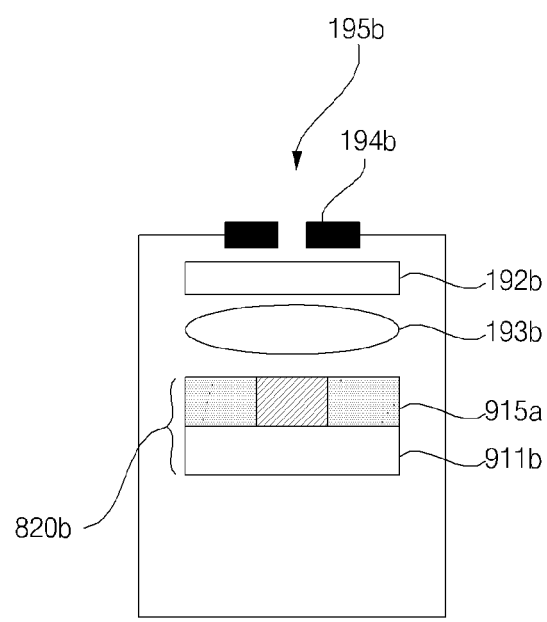
FIG. 3A is an internal cross-sectional view of the camera of FIG. 2.

FIG. 3A is an internal cross-sectional view of the camera of FIG. 2.

Referring to the drawing, FIG. 3A is an example of a cross-sectional view of a second camera 195b inside the camera 195.

The second camera 195b may include an aperture 194b, a dual prism structure 192b, a lens structure 193b and an image sensor 820b.

The aperture 194b may open and close the light incident on the lens structure 193b.

The image sensor 820b may include an RGB filter 915b, and a sensor array 911b for converting an optical signal into an electric signal, in order to sense RGB colors.

Accordingly, the image sensor 820b may sense and output RGB images, respectively.

Figure 3B:
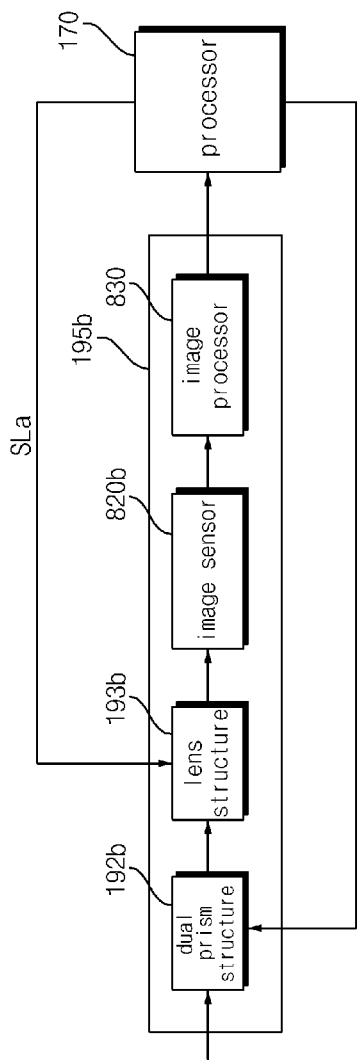
FIG. 3B is an internal block diagram of the camera of FIG. 2.

FIG. 3B is an internal block diagram of the camera shown in FIG. 2.

Referring to the drawing, FIG. 3B shows an example of a block diagram of the second camera 195b in the camera 195.

The second camera 195b may include the dual prism structure 192b, the lens structure 193b, the image sensor 820b and an image processor 830.

The image processor 830 may generate an RGB image based on an electric signal from the image sensor 820b.

Meanwhile, the image sensor 820b may adjust an exposure time based on the electric signal.

Meanwhile, the RGB image generated by the image processor 830 may be transferred to the processor 170 of the mobile terminal 100.

Meanwhile, the processor 170 of the mobile terminal 100 may output a control signal to the lens structure 193b for movement of a lens in the lens structure 193b. For example, a control signal for autofocusing may be output to the lens structure 193b.

Meanwhile, the processor 170 of the mobile terminal 100 may output a control signal for an image stabilization function in the dual prism structure 192b to the dual prism structure 192b.

Figure 3C:
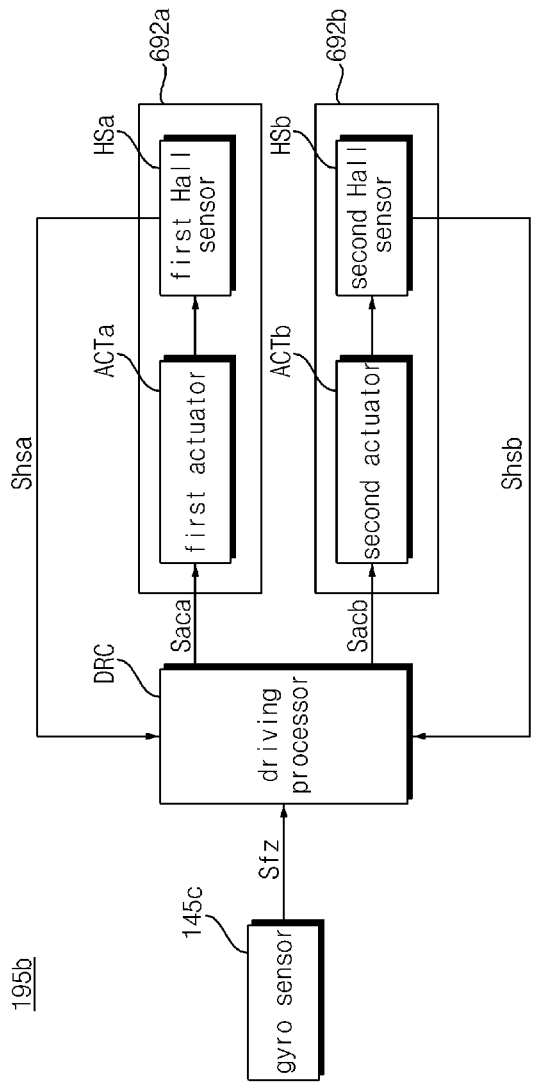
FIGS. 3C and 3D illustrate various examples of an internal block diagram of the camera shown in FIG. 2.
Figure 3D:
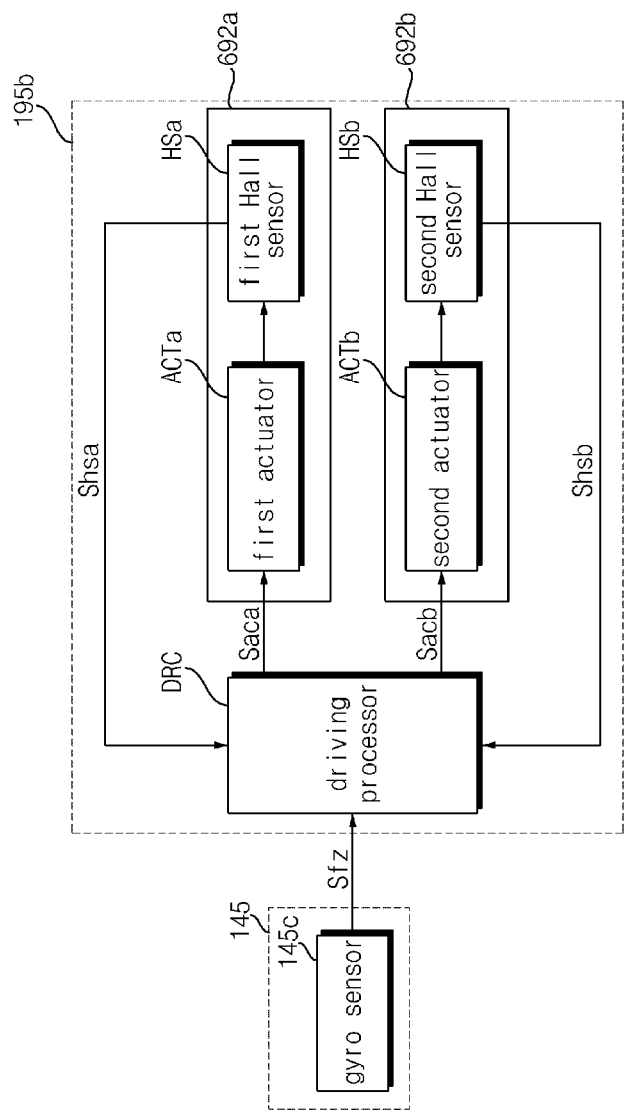

FIGS. 3C and 3D illustrate various examples of an internal block diagram of the camera shown in FIG. 2.

First, FIG. 3C illustrates a gyro sensor 145c, a driving processor DRC, a first prism module 692a and a second prism module 692b, which are included in the camera 195b.

The gyro sensor 145c may detect a first directional movement and a second directional movement. In addition, the gyro sensor 145c may output movement information Sfz including the first directional movement and the second directional movement.

The driving processor DRC may output control signals Saca and Sacb for movement compensation based on the movement information Sfz including the first directional movement and the second directional movement to the first prism module 692a and the second prism module 692b, respectively.

Particularly, the driving processor DRC may output control signals to a first actuator ACTa and a second actuator ACTb in the first directional movement and the second directional movement to the first prism module 692a, respectively.

The first control signal Saca may be a control signal for a first directional movement compensation detected in the gyro sensor 145c, and the second control signal Sacb may be a control signal for a second directional movement compensation detected in the gyro sensor 145c.

The first actuator ACTa, based on the first control signal Saca, may change an angle of a first prism PSMa along a first rotation axis.

The second actuator ACTb, based on the second control signal Sacb, may change an angle of a second prism PSMb along a second rotation axis.

Meanwhile, a first Hall sensor HSa and a second Hall sensor HSb in the first prism PSMa and the second prism PSMb may sense magnetic field changes according to the movements of the first prism PSMa and the second prism PSMb, respectively, in order to check movement information.

Particularly, the first Hall sensor HSa detects an angle change of the first prism PSMa based on first magnetic field, and the second Hall sensor HSb detects an angle change of the first prism PSMa based on second magnetic field.

Furthermore, the movement information detected by the first Hall sensor HSa and the second Hall sensor HSb, particularly, first and second magnetic field change information Shsa and Shsb may be input to the driving processor DRC.

The driving processor DRC may perform PI control and the like based on the control signal Saca and Sacb for movement compensation and the movement information, particularly, the first and second magnetic field change information Shsa and Shsb, and accordingly, may control movements of the first prism PSMa and the second prism PSMb precisely.

That is, the driving processor DRC may receive the information Shsa and Shsb detected by the first Hall sensor HSa and the second Hall sensor HSb and may perform a closed loop control, and accordingly, may control movements of the first prism PSMa and the second prism PSMb precisely.

Next, FIG. 3D is similar to FIG. 3C, but there is a difference in that the gyro sensor 145c is included in the motion sensor 145 in the separate sensing unit 140 in the mobile terminal 100, not inside of the camera 195b.

Accordingly, although it is not shown in FIG. 3D, the camera 195b shown in FIG. 3D may further include an interface unit (not shown) for receiving a signal from the external gyro sensor 145c.

Meanwhile, the movement information Sfz including the first directional movement and the second directional movement received from the gyro sensor 145c is input to the driving processor DRC. The operation of the driving processor DRC may be the same as the description of FIG. 3C.

Figure 4A:
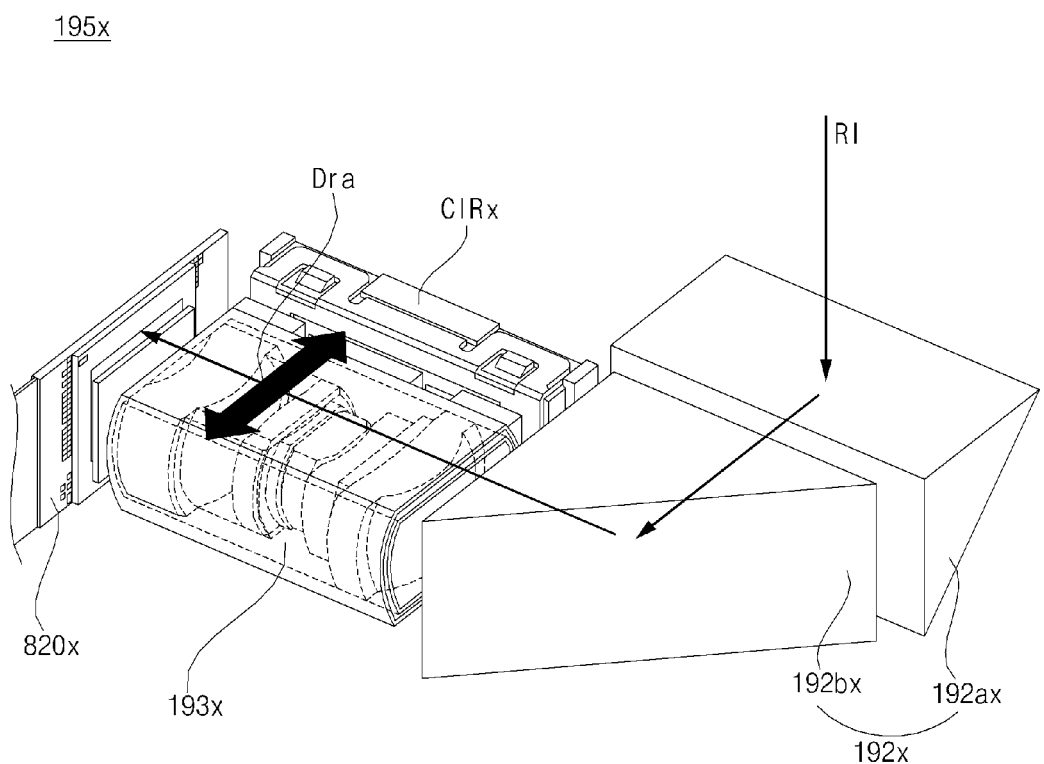
FIG. 4A is a diagram illustrating a camera of a dual prism structure.

FIG. 4A is a diagram illustrating a camera of a dual prism structure.

FIG. 4A illustrates that a camera 195x includes an image sensor 820x, a lens structure 193x for transferring light to the image sensor, a lens driver CIRx for moving a lens in the lens structure 193x and a dual prism structure 192x provided with a first prism 192ax and a second prism 192bx.

The camera 195x of FIG. 4A may perform a movement of the lens structure 193x for preventing a hand tremor. The drawing illustrates that a compensation is performed in a Dra direction.

According to the scheme, there is a disadvantage that more hand tremor compensation should be performed in the case that an optical zoom is in a high magnification state. Therefore, an accuracy of the hand tremor compensation is degraded.

In addition, in the case of the scheme, a lens movement direction needs to cross the Dra direction, and accordingly, there is a disadvantage that it is hard to implement a lens movement and a movement for preventing a hand tremor simultaneously.

According to the present disclosure, in order to supplement the disadvantage, a hand tremor compensation is implemented in a prism module, and particularly, an angle compensation is performed by using a rotational actuator. According to this, with the performance of the angle compensation, there is an advantage that an angle within a predetermined range only needs to be compensated without regard to the case that the optical zoom of the lens structure 193x is in low magnification or high magnification state. For example, by using a plurality of prism modules, in respective first and second rotational directions, a first angle may be compensated. Accordingly, without regard to an optical zoom, an angle compensation within a predetermined range becomes available, and therefore, an accuracy of the hand tremor compensation is improved. This is described with reference to FIG. 5A below.

Figure 4B:
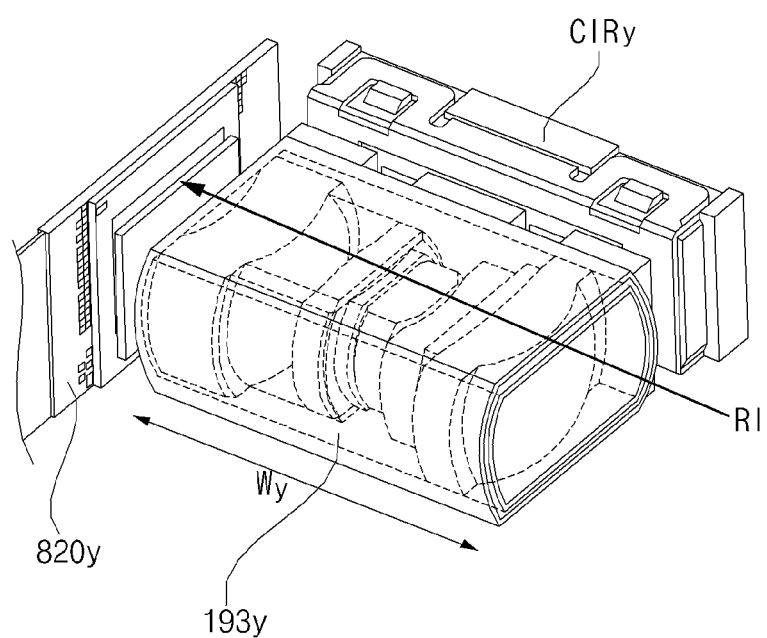
FIGS. 4B and 4C are diagrams illustrating a camera of which a dual prism structure is omitted.
Figure 4C:
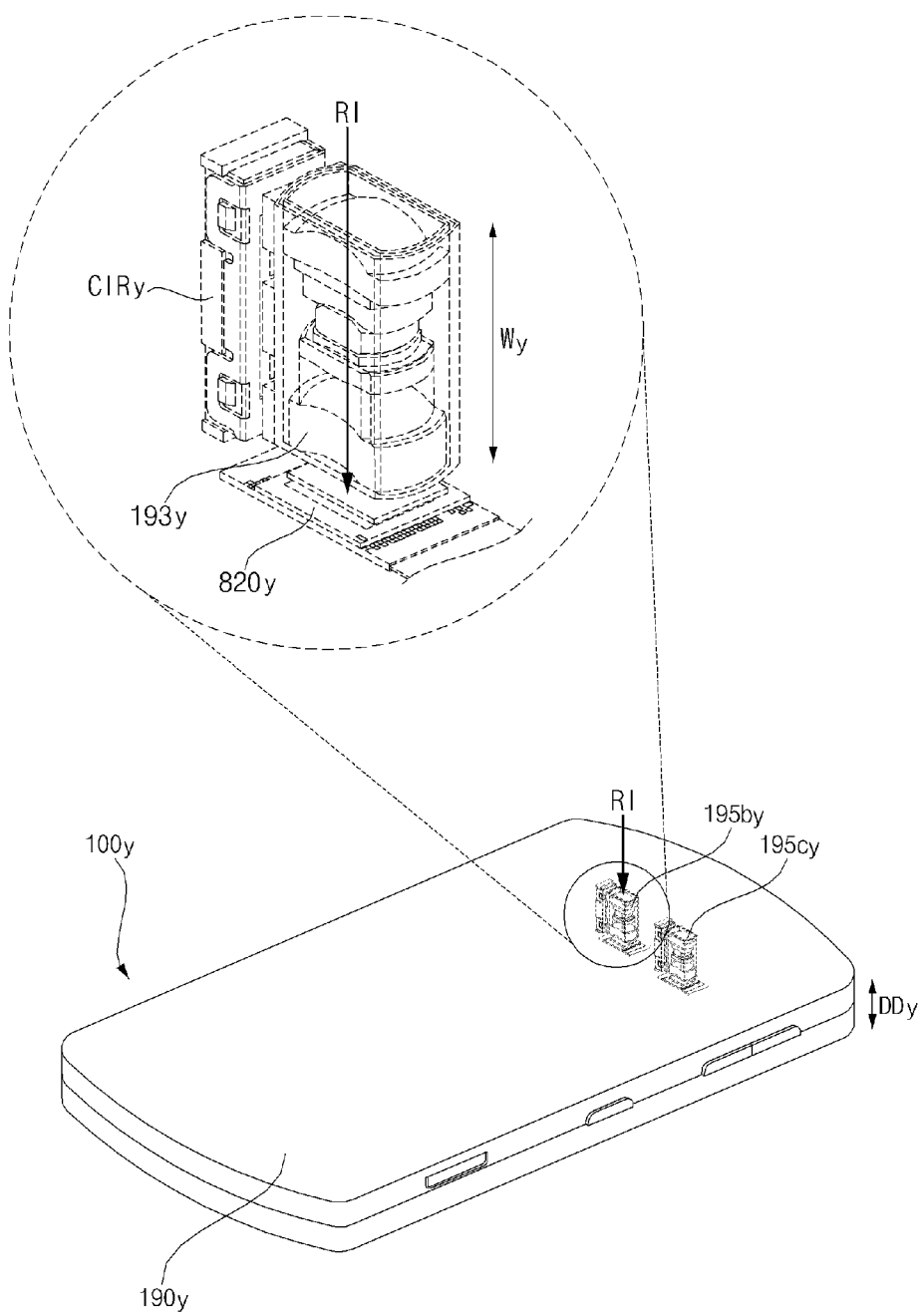

FIGS. 4B and 4C are diagrams illustrating a camera of which a dual prism structure is omitted.

FIG. 4B illustrates that a camera 195y includes an image sensor 820y, a lens structure 193y for transferring light to the image sensor and a lens driver CIRy for moving a lens in the lens structure 193y.

Meanwhile, according to the camera 195y of FIG. 4B, since a plurality of prism structure is not included, the incident light RI is input through the lens structure 193y directly, and accordingly, the lens structure 193y and the image sensor 820y need to be arranged vertically with respect to the incident light RI.

That is, in a mobile terminal 100y shown in FIG. 4C, the incident light RI is transferred to the image sensor 820y via the lens structure 193y.

Recently, with the tendency of high image quality and high performance, a length Wy of the lens structure 193y is elongated. According to the structure, there is a disadvantage that as the length Wy of the lens structure 193y increases, a thickness DDy of the mobile terminal 100y becomes thicker.

Accordingly, in the present disclosure, in order to solve it, a dual prism is adopted, and a first prism and a second prism are arranged to cross with each other such that light paths RI of the first prism and the second prism are different. According to the structure, an implementation of L-shaped camera is available, and therefore, a slim camera of which thickness becomes thinner can be implemented. This is described with reference to FIG. 5A below.

Figure 5A:
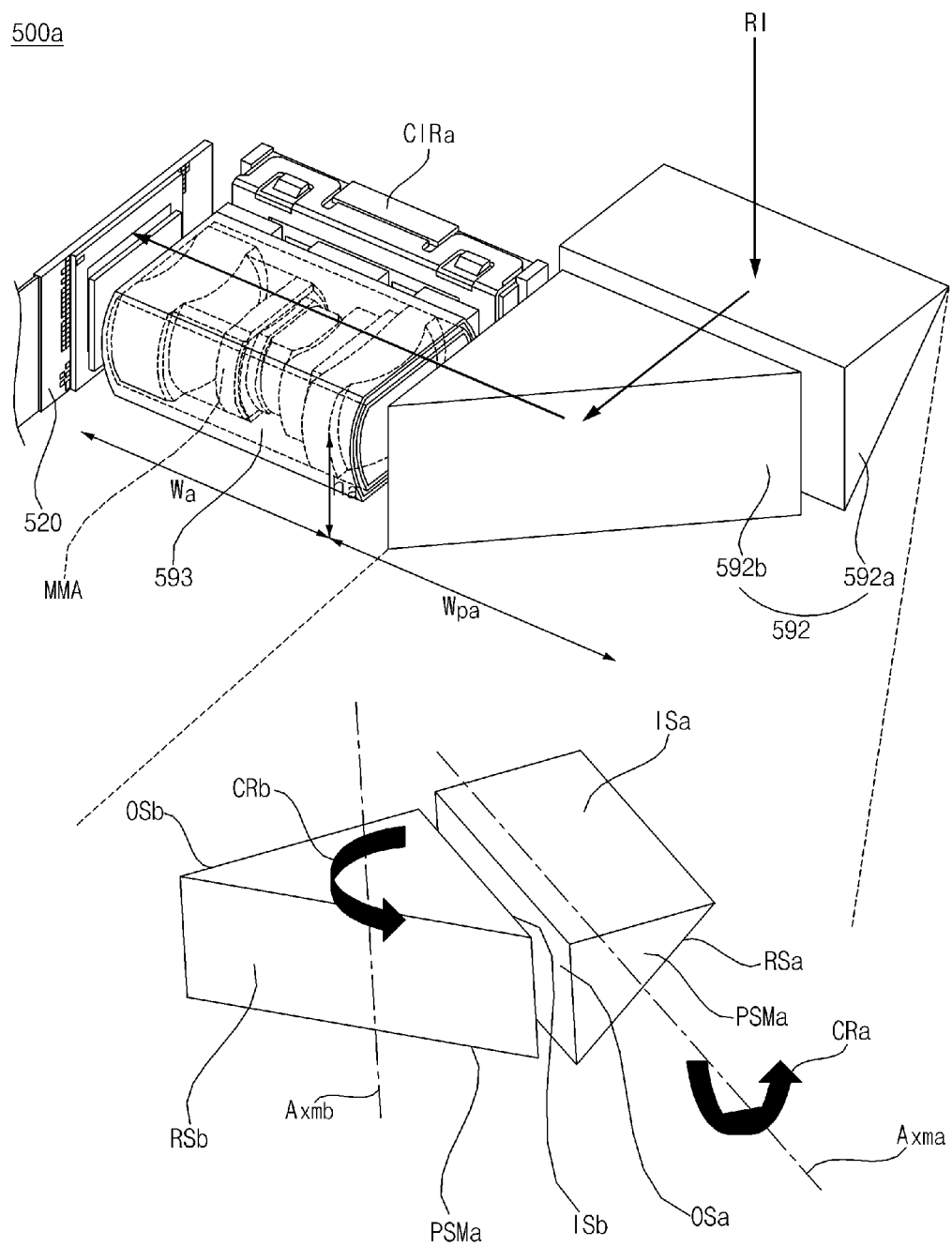
FIG. 5A is a diagram illustrating an example of a camera including a lens structure according to an embodiment of the present disclosure.
Figure 5B:
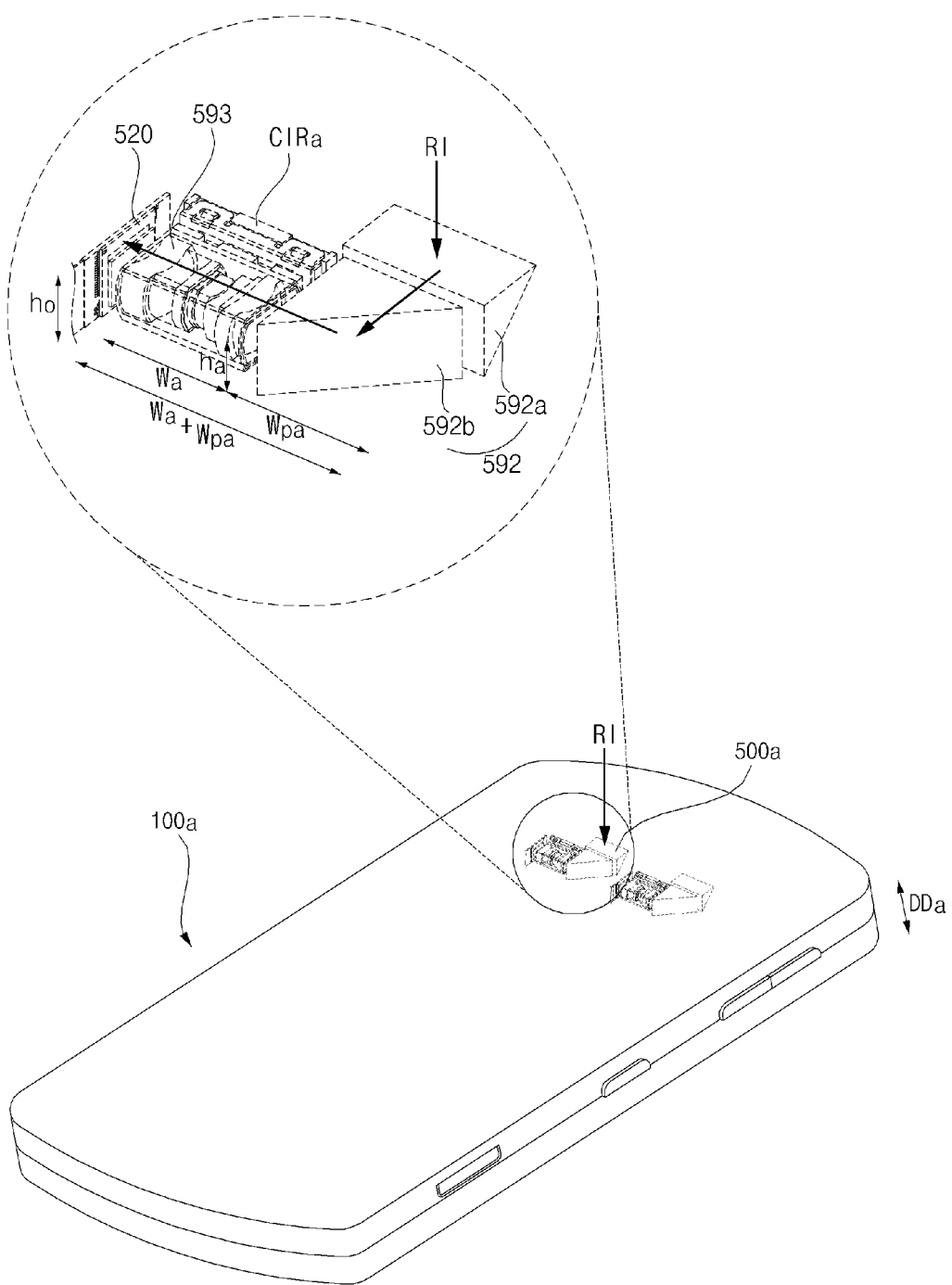
FIG. 5B is a diagram illustrating a mobile terminal including the camera of FIG. 5A.

FIG. 5A is a diagram illustrating an example of a camera including a lens structure according to an embodiment of the present disclosure, and FIG. 5B is a diagram illustrating a mobile terminal including the camera of FIG. 5A.

FIG. 5A illustrates that a camera 500a includes an image sensor 520, a lens structure 593 for transferring light to the image sensor 520 and a dual prism structure 592 provided with a first prism module 592a and a second prism module 592b.

Different from FIG. 4A, the dual prism structure 592 rotates in order to implement a hand tremor prevention function.

Meanwhile, different from FIG. 4A, since the lens structure 593 is not implemented with the hand tremor prevention function, the lens structure 593 may be implemented to be slimmer.

The lens structure 593 may include at least one lens for variable focus.

For example, the lens structure 593 may include a plurality of lenses such as a concave lens and a convex lens.

Particularly, the lens structure 593 may include a micro mirror array (MMA) for variable focus.

The micro mirror array (MMA) may vary a tilting angle of a plurality of micro mirrors MLEa to MLEn based on a curvature control signal from the image processor 830 or the processor 170.

Meanwhile, in the micro mirror array (MMA), between a first micro mirror and a second micro mirror in a plurality of micro mirrors MLEa to MLEn, according to the control signal, it is preferable that a tilting angle of the second micro mirror closer to an outside is greater. Accordingly, a focus may be varied using the micro mirror array (MMA). Therefore, an implementation of a slim camera becomes available.

Meanwhile, FIG. 5A illustrates the arrangement in the order of the image sensor 520, the lens structure 593 and the dual prism structure 592 and that the light incident to the dual prism structure 592 is transferred to the lens structure 593 and image sensor 520. But a modification from it is available.

Particularly, the light from upper side is reflected on a first internal reflection surface RSa of a first prism PSMa in the first prism module 592a and transferred to the second prism module 592b, and then, reflected on a second internal reflection surface RSb of a second prism PSMb in the second prism module 592b and transferred to the image sensor 520.

That is, different from FIG. 5A, it is shown the order of the image sensor 520, the dual prism structure 592 and the lens structure 593 and that the light incident to the lens structure 593 is transferred to the dual prism structure 592 and image sensor 520.

The dual prism structure 592 may include a first prism PSMa for reflecting an incident light in a first reflection direction, a first actuator ACTa for changing the first reflection direction by changing an angle of the first prism PSMa around a first rotation axis Axma based on a first control signal Saca, a second prism PSMb for reflecting the light reflected by the first prism PSMa to a second reflection direction and a second actuator ACTb for changing the second reflection direction by changing an angle of the second prism PSMb around a second rotation axis Axmb based on an input second control signal Sacb.

The first prism PSMa includes a first internal reflection surface RSa, and the second prism PSMb includes a second internal reflection surface.

Meanwhile, the first prism PSMa receives an incident light through a first incident prism surface ISa and outputs a reflected incident light from the first internal reflection surface RSa through a first output prism surface OSa. The second prism PSMb receives a reflected incident light through a second incident prism surface ISb and outputs a reflected light reflected from the second internal reflection surface RSb.

Meanwhile, the first output prism surface OSa of the first prism PSMa faces the second incident prism surface ISb of the second prism PSMb.

Meanwhile, the first rotation axis Axma of the first prism PSMa is orthogonal to the second rotation axis Axmb of the second prism PSMb.

In this case, it is preferable that the first prism PSMa and the second prism PSMb are disposed to intersect with each other. Particularly, it is preferable that the first prism PSMa and the second prism PSMb are orthogonally disposed.

Meanwhile, the refractive indices of the first prism PSMa and the second prism PSMb may be 1.7 or greater. Accordingly, total reflection may be performed in the first prism PSMa and the second prism PSMb, and consequently, light RI may be transferred to the image sensor direction.

Meanwhile, the refractive indices of the first prism PSMa and the second prism PSMb may be less than 1.7, and reflective coatings may be formed on the reflection surfaces of the respective first prism PSMa and the second prism PSMb. Accordingly, total reflection may be performed in the first prism PSMa and the second prism PSMb, and consequently, light RI may be transferred to the image sensor direction.

Accordingly, the image sensor 520, the lens structure 593 and the first prism module 592a may be disposed in one direction side by side, but the second prism module 592b may be disposed to intersect with the first prism module 592a.

Accordingly, the first prism module 592a and the second prism module 592b may be referred to as the L-shaped dual prism structure 592. In addition, such a camera 500a structure may be referred to as the L-shaped type camera.

According to the structure, the first prism module 592a and the second prism module 592b may perform an angle compensation by rotating in a first direction CRa, for example, counter clockwise direction ccw based on the first rotation axis Axma and by rotating in a second direction CRb, for example, counter clockwise direction ccw based on the second rotation axis Axmb, and therefore, may implement the hand tremor prevention function.

For example, in response to the movement causing ratation of the first prism PSMa around the first rotation axis Axma by a first angle and ratation of the second prism PSMb around the second rotation axis Axmb by a second angle, the first actuator ACTa rotates the first prism PSMa in a third direction opposite to the first direction by a third angle in response to the first control signal Saca, and the second actuator ACTb rotates the second prism PSMb a fourth direction opposite to the second direction by a fourth angle in response to the second control signal Sacb. The third angle is a half of the first angle, and the fourth angle is a half of the second angle.

Particularly, the first actuator ACTa and the second actuator ACTb are used, and an angle compensation is performed, and accordingly, there is an advantage that an angle within a predetermined range only needs to be compensated without regard to the case that the optical zoom of the lens structure 593 is in low magnification or high magnification state. Consequently, without regard to an optical zoom, an accuracy of the hand tremor compensation is improved.

In addition, an optimal space arrangement is available within a limited space, and accordingly, a slim camera 500a may be implemented. Accordingly, this may be applied to the mobile terminal 100.

FIG. 5A illustrates that a length of the lens structure 593 is Wa, a length of the dual prism structure 592 is Wpa, and a height of the lens structure 593 and the dual prism structure 592 is ha.

Since the first prism module 592a and the second prism module 592b in the dual prism structure 592 are disposed to intersect with each other, as in the mobile terminal 100a of FIG. 5B, a propagation direction of the incident light RI is changed in two times through the first prism module 592a and the second prism module 592b, and the image sensor 520 is disposed at a left side of the mobile terminal 100a. Particularly, the image sensor 520 may be disposed to face a side surface of the mobile terminal 100a.

Accordingly, the thickness DDa of the mobile terminal 100y is determined by the height ha of the lens structure 593 and the dual prism structure 592 or a height ho of the image sensor, not by a summation (Wa+Wpa) of the lengths of the lens structure 593 and the dual prism structure 592.

Therefore, as the height ha of the lens structure 593 and the dual prism structure 592 or the height ho of the image sensor are designed to be lower, the thickness DDa of the mobile terminal 100y may be implemented slimly. Consequently, it may be implemented the slim camera 500a of which thickness decreases and the mobile terminal provided with it.

FIGS. 5C to 5G are diagrams referred for a description of the micro mirror array shown in FIG. 5A.

Figure 5C:
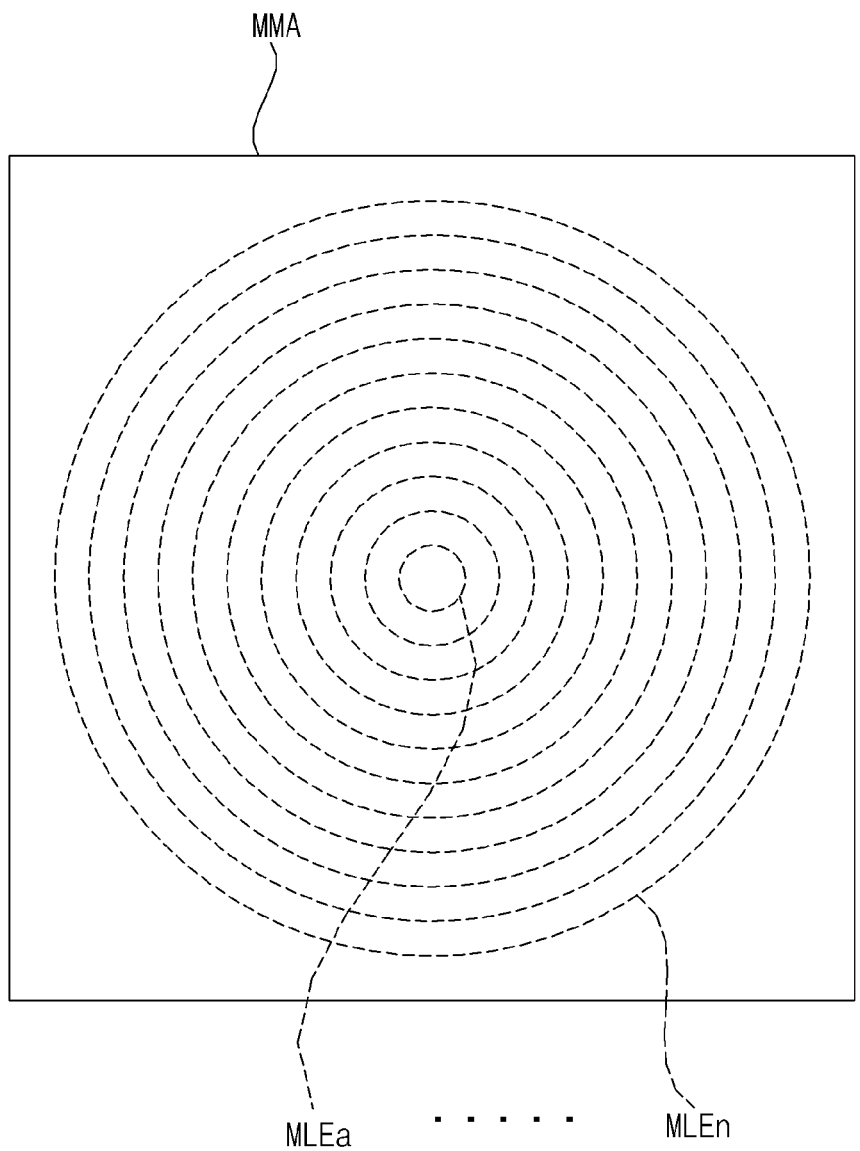
FIGS. 5C to 5G are diagrams referred for a description of the micro mirror array shown in FIG. 5A.

First, FIG. 5C illustrates a front view of the micro mirror array (MMA).

Referring to the drawing, the micro mirror array (MMA) may include a plurality of micro mirrors MLEa to MLEn.

As shown in the drawing, the micro mirror array (MMA) may be arranged in a plurality of concentric circles. Accordingly, a focus may be varied using the micro mirror array (MMA).

Figure 5D:
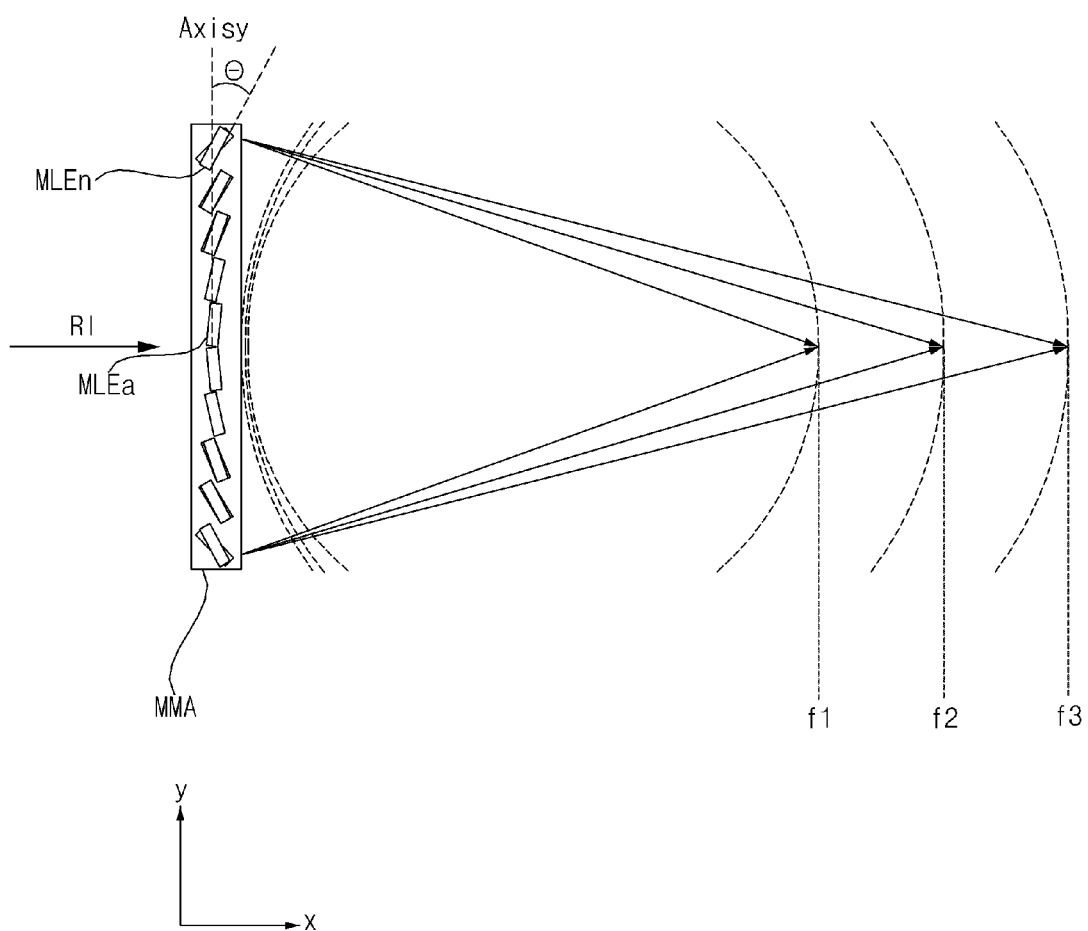

FIG. 5D illustrates that a tilting angle of a plurality of micro mirrors MLEa to MLEn varies according to an applied electric signal, and accordingly, a focal length by the micro mirror array (MMA) is varied like f1 to f3.

A tilting angle θ of a plurality of micro mirrors MLEa to MLEn may represent an angle between a vertical axis aAsixy perpendicular to incident light RI and a plurality of micro mirrors MLEa to MLEn.

Meanwhile, between a first micro mirror and a second micro mirror in a plurality of micro mirrors MLEa to MLEn, according to the control signal, it is preferable that a tilting angle of the second micro mirror closer to an outside is greater. Accordingly, a focus may be varied using the micro mirror array (MMA). Therefore, an implementation of a slim camera becomes available.

FIG. 5D illustrates that a tilting angle of the micro mirror MLEn located at the exterior position is greater than a tilting angle of the micro mirror MLEa located at the center among a plurality of micro mirrors MLEa to MLEn.

That is, it is preferable that the tilting angle θ of a plurality of micro mirrors MLEa to MLEn increases gradually from the center to the exterior.

Meanwhile, the processor 170 may control the micro mirror array (MMA) to form a first focus by outputting a first curvature control signal at a first time and may control the micro mirror array (MMA) to form a second focus by outputting a second curvature control signal on second time after the first time. Accordingly, the focus may be varied continuously using the micro mirror array (MMA).

Meanwhile, in the case that the tilting angle of the micro mirror array (MMA) is greater at the second time than that of the first time, a second focus may be established closer to a first focus. Accordingly, the focus may be varied continuously using the micro mirror array (MMA).

For example, at the first time, in the state that a focal length is f2, in the case that the tilting angle of the micro mirror array (MMA) is greater at the second time, a focal length may be formed at the first time closer than f2.

Figure 5E:
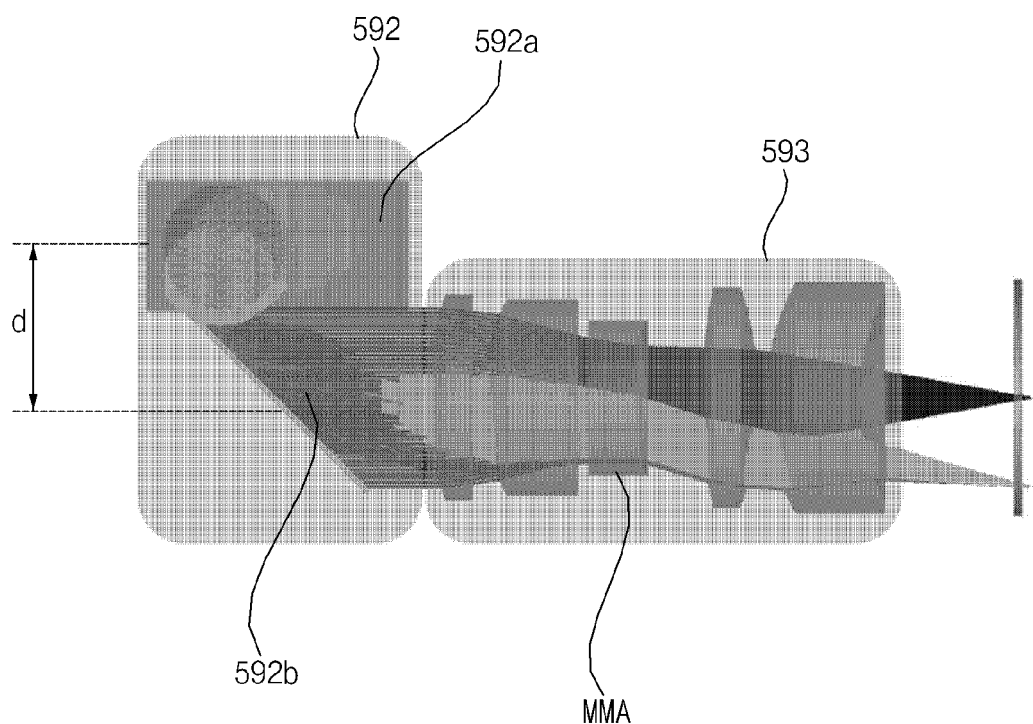
Figure 5F:
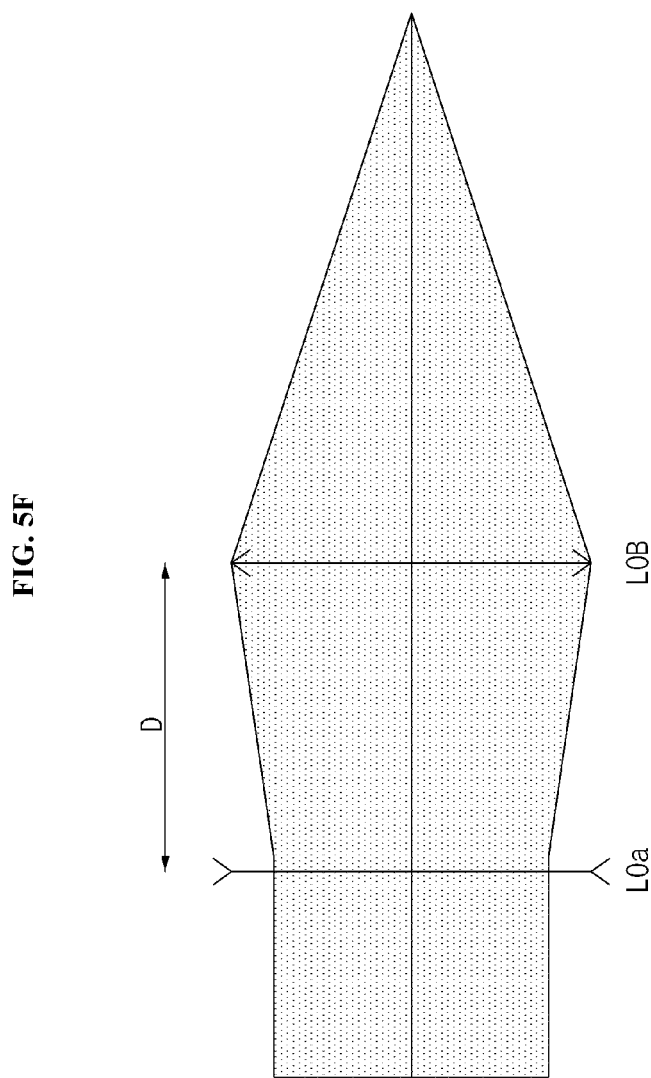
Figure 5G:
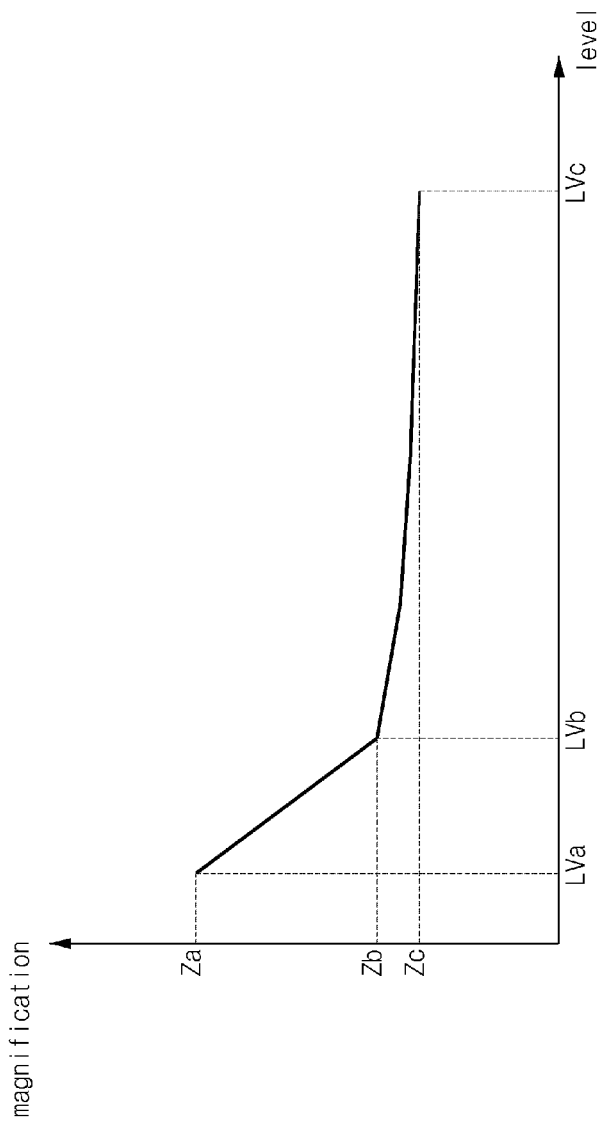

Meanwhile, as shown in FIG. 5G, a magnification may be increased as the focal length becomes closer.

Accordingly, at the first time, through the camera 500a, an image of a first magnification corresponding to focal length f2 may be obtained at the first time, and in the case that the tilting angle of the micro mirror array (MMA) is greater an image of a second magnification corresponding to focal length f1 may be obtained at the second time.

Therefore, using the micro mirror array (MMA) in the camera 500a, an image of which magnification is continuously varied may be obtained.

Meanwhile, FIG. 5E and FIG. 5F are diagrams referred for a focal length computation.

A focal length f of the micro mirror array (MMA) may be inversely proportional to d, which is a distance between prisms PSMa and PSMb in the first prism module 592a and the second prism module 592b, respectively.

A focal length f of the micro mirror array (MMA) may be proportional to D, which is a distance between a position Loa of the micro mirror array (MMA) and a position LOB of lens.

FIG. 5G is a diagram illustrating a relation between a focal length and a magnification.

Referring to the drawing, in the case that a focal length is LVa, a magnification may be greatest as Za, and in the case that a focal length is LVb, which is greater than LVa, a magnification may be Zb, which is smaller than Za. And in the case that a focal length is LVc, which is greater than LVb, a magnification may be Zc, which is smaller than Zb.

Figure 6A:
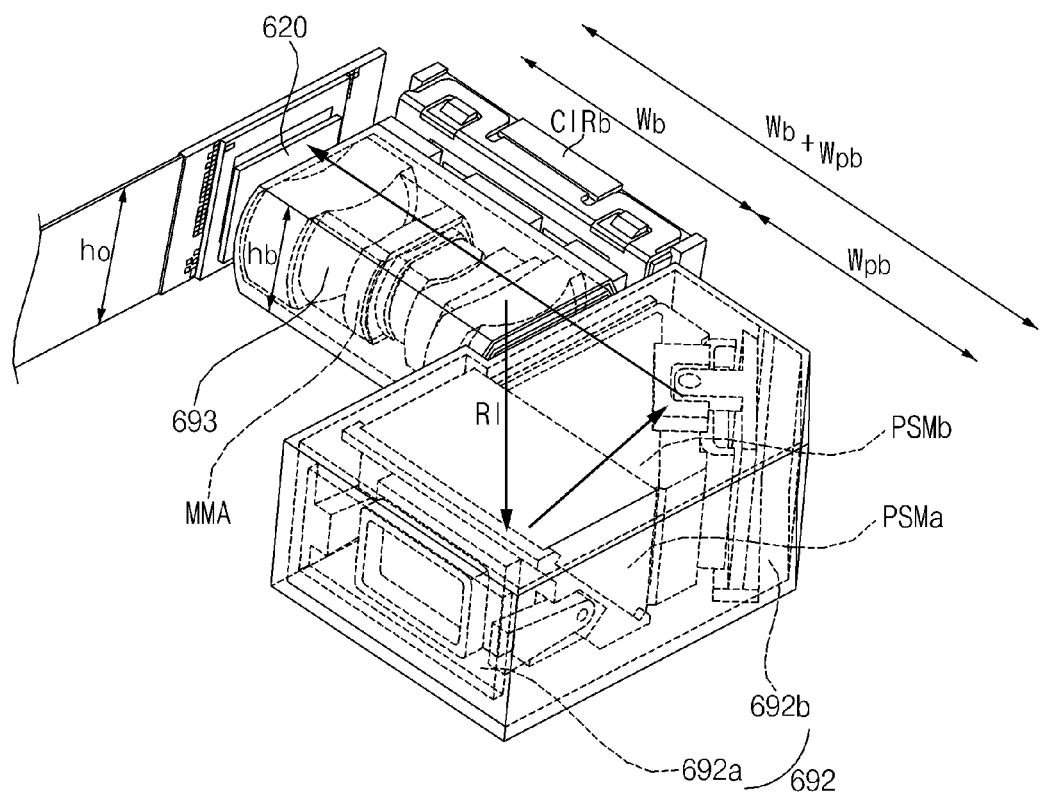
FIG. 6A is a diagram illustrating another example of a camera including a lens structure according to an embodiment of the present disclosure.
Figure 6B:
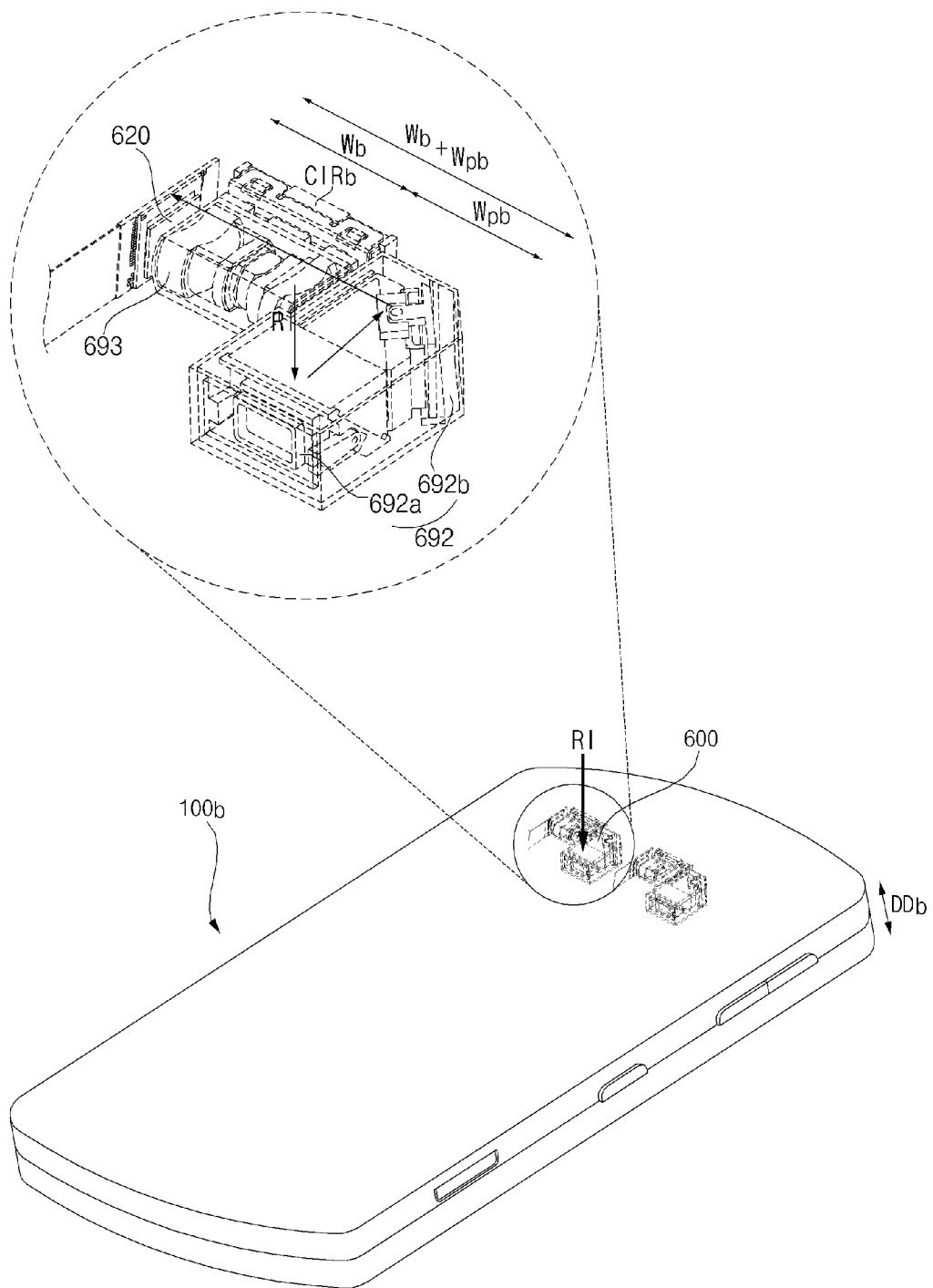
FIG. 6B is a diagram illustrating a mobile terminal including the camera of FIG. 6A.

FIG. 6A is a diagram illustrating an example of a camera including a rotatable dual prism module according to an embodiment of the present disclosure, and FIG. 6B is a diagram illustrating a mobile terminal including the camera of FIG. 6A. FIGS. 7 to 10 are diagrams referred for a description of the camera of FIG. 6A.

FIG. 6A illustrates that a camera 600 includes an image sensor 620, a lens structure 693 for transferring light to the image sensor 620 and a dual prism structure 692 including a first prism module 692a and a second prism module 692b.

The lens structure 693 may include at least one lens for variable focus.

For example, the lens structure 693 may include a plurality of lenses such as a concave lens and a convex lens.

Particularly, the lens structure 693 may include a micro mirror array (MMA) for variable focus.

The micro mirror array (MMA) may vary a tilting angle of a plurality of micro mirrors MLEa to MLEn based on a curvature control signal from the image processor 830 or the processor 170.

Meanwhile, in the micro mirror array (MMA), between a first micro mirror and a second micro mirror in a plurality of micro mirrors MLEa to MLEn, according to the control signal, it is preferable that a tilting angle of the second micro mirror closer to an outside is greater. Accordingly, a focus may be varied using the micro mirror array (MMA). Therefore, an implementation of a slim camera becomes available.

Meanwhile, the operation of the micro mirror array (MMA) is the same as the description described in FIG. 5C to FIG. 5G.

The camera 600 shown in FIG. 6A is similar to the camera 500a shown in FIG. 5A, but there is a difference that an arrangement of the first prism module 692a and the second prism module 692b is different. The difference is mainly described.

FIG. 6A illustrates the arrangement in the order of the image sensor 620, the lens structure 693 and the dual prism structure 692, and that the light incident to the dual prism structure 692 is transferred to the lens structure 693 and image sensor 620.

Particularly, the light from upper side is reflected on a reflection surface of a first prism PSMa in the first prism module 692a and transferred to the second prism module 692b, and then, reflected on a reflection surface of a second prism PSMb in the second prism module 692b and transferred to the image sensor 620.

That is, different from FIG. 5A, the first prism module 692a in the dual prism structure 692 is disposed in a forward direction in comparison with the second prism module 692b.

Accordingly, the light reflected on the prism module PSMa in the first prism module 692a is propagated in a ground direction or a right direction.

That is, different from FIG. 6A, it is arranged in the order of the image sensor 620, the dual prism structure 692 and the lens structure 693, the light incident to the lens structure 693 may be transferred to the dual prism structure 692 and image sensor 620. Hereinafter, the structure of FIG. 6A is mainly described.

The dual prism structure 692 may include a first prism PSMa for reflecting an incident light in a first reflection direction, a first actuator ACTa for changing the first reflection direction by changing an angle of the first prism PSMa around a first rotation axis Axma based on a first control signal Saca, a second prism PSMb for reflecting the light reflected by the first prism PSMa to a second reflection direction and a second actuator ACTb for changing the second reflection direction by changing an angle of the second prism PSMb around a second rotation axis Axmb based on an input second control signal Sacb.

The first prism PSMa includes a first internal reflection surface RSa, and the second prism PSMb includes a second internal reflection surface.

Meanwhile, the first prism PSMa receives an incident light through a first incident prism surface ISa and outputs a reflected incident light from the first internal reflection surface RSa through a first output prism surface OSa. The second prism PSMb receives a reflected incident light through a second incident prism surface ISb and outputs a reflected light reflected from the second internal reflection surface RSb.

Meanwhile, the first output prism surface OSa of the first prism PSMa faces the second incident prism surface ISb of the second prism PSMb.

Meanwhile, the first rotation axis Axma of the first prism PSMa is orthogonal to the second rotation axis Axmb of the second prism PSMb.

In this case, it is preferable that the first prism PSMa and the second prism PSMb are disposed to intersect with each other. Particularly, it is preferable that the first prism PSMa and the second prism PSMb are orthogonally disposed.

Meanwhile, the refractive indices of the first prism PSMa and the second prism PSMb may be 1.7 or greater. Accordingly, total reflection may be performed in the first prism PSMa and the second prism PSMb, and consequently, light RI may be transferred to the image sensor direction.

Meanwhile, the refractive indices of the first prism PSMa and the second prism PSMb may be less than 1.7, and reflective coatings may be formed on the reflection surfaces of the respective first prism PSMa and the second prism PSMb. Accordingly, total reflection may be performed in the first prism PSMa and the second prism PSMb, and consequently, light RI may be transferred to the image sensor direction.

According to this, the image sensor 620, the lens structure 693 and the first prism module 692a may be disposed in one direction side by side, but the second prism module 692b may be disposed to intersect with the first prism module 692a.

Accordingly, the first prism module 692a and the second prism module 692b may be referred to as the L-shaped dual prism structure 692. In addition, such a camera 600 structure may be referred to as the L-shaped type camera.

According to the structure, the first prism module 692a and the second prism module 692b may perform an angle compensation by rotating in a first direction, for example, counter clockwise direction ccw based on the first rotation axis Axma and by rotating in a second direction, for example, counter clockwise direction ccw based on the second rotation axis Axmb, and therefore, may implement the hand tremor prevention function.

Particularly, the rotational actuator is used, and an angle compensation is performed, and accordingly, there is an advantage that an angle within a predetermined range only needs to be compensated without regard to the case that the optical zoom of the lens structure 693 is in low magnification or high magnification state. Consequently, without regard to an optical zoom, an accuracy of the hand tremor compensation is improved.

In addition, an optimal space arrangement is available within a limited space, and accordingly, a slim camera 600 may be implemented. Accordingly, this may be applied to the mobile terminal 100.

FIG. 6A illustrates that a length of the lens structure 693 is Wb, a length of the dural prism structure 692 is Wpb, and a height of the lens structure 693 and the dual prism structure 692 is hb.

Since the first prism module 692a and the second prism module 692b in the dual prism structure 692 are disposed to intersect with each other, as in the mobile terminal 100b of FIG. 6B, a propagation direction of the incident light RI is changed in two times through the first prism module 692a and the second prism module 692b, and the image sensor 620 is disposed at a left side of the mobile terminal 100b. Particularly, the image sensor 620 may be disposed to face a side surface of the mobile terminal 100b.

Accordingly, the thickness DDb of the mobile terminal 100y is determined by the height hb of the lens structure 693 and the dual prism structure 692 or a height ho of the image sensor, not by a summation (Wb+Wpb) of the lengths of the lens structure 693 and the dual prism structure 692.

Therefore, as the height ha of the lens structure 693 and the dual prism structure 692 or the height ho of the image sensor are designed to be lower, the thickness DDb of the mobile terminal 100y may be implemented slimly. Consequently, it may be implemented the slim camera 600 of which thickness decreases and the mobile terminal provided with it.

Figure 7:
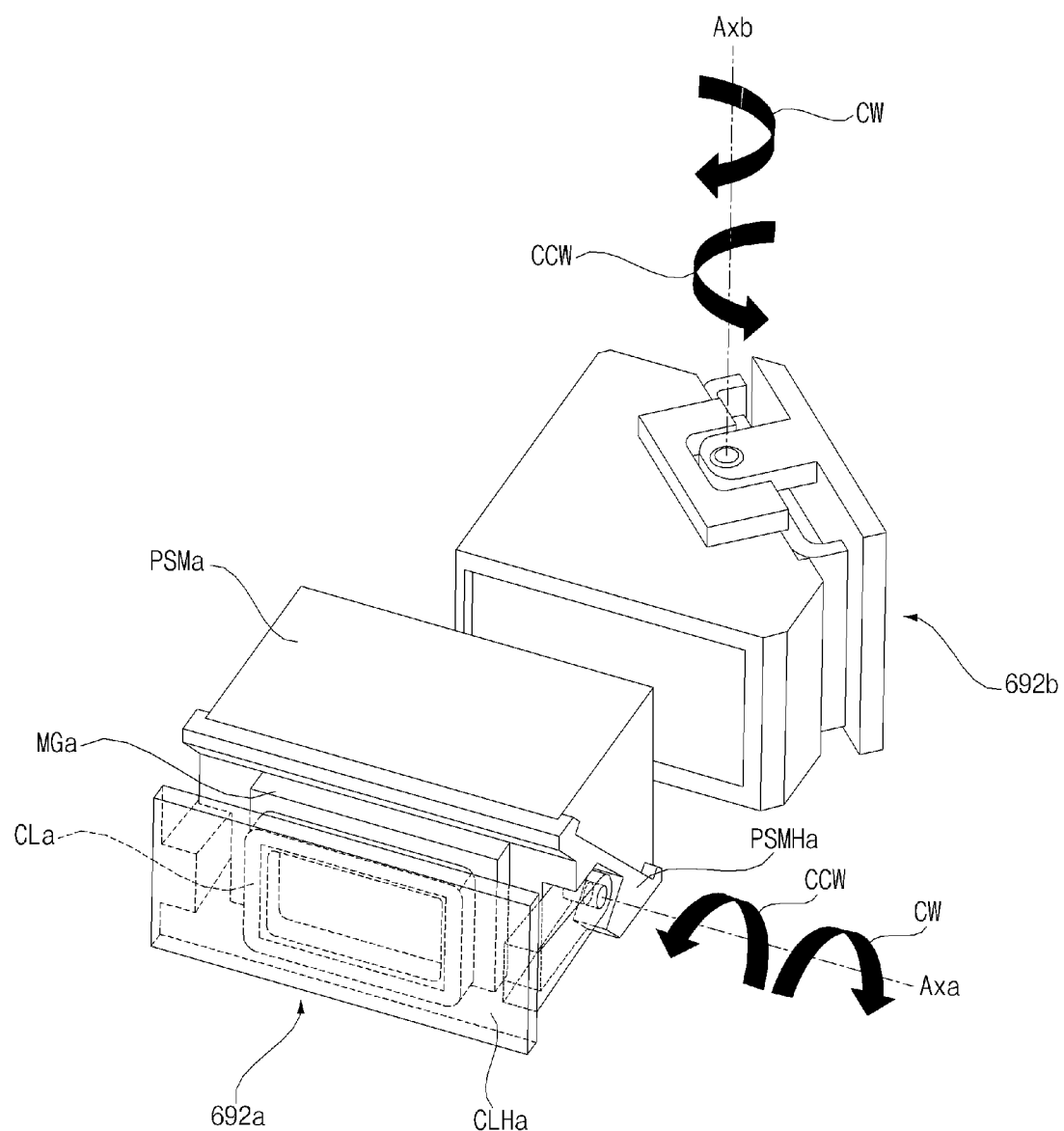
FIGS. 7 to 10 are diagrams referred in the description of the camera shown in FIG. 6A.
Figure 8:
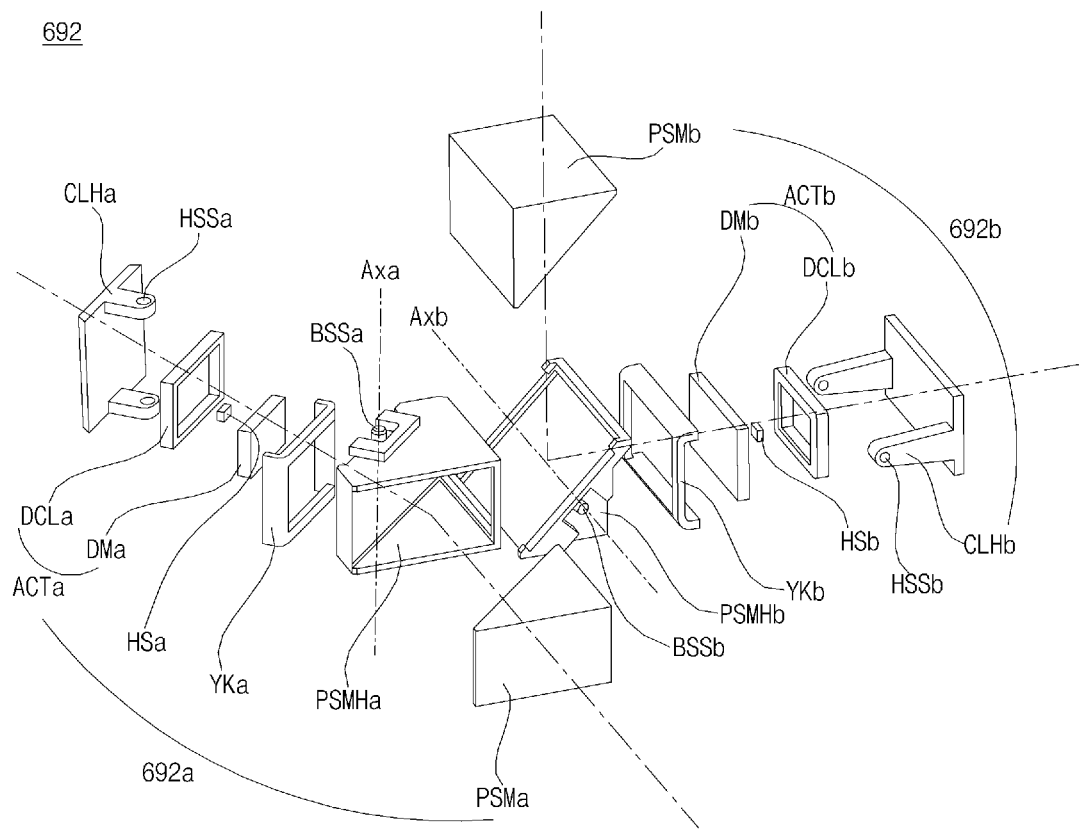

Meanwhile, in describing with reference to FIG. 7 and FIG. 8, the dual prism structure 692 may include the first prism module 692a and the second prism module 692b.

The first prism module 692a may include the prism PSMa, a first prism holder PSMHa for fixing the first prism PSMa, a first yoke Yka coupled to a rear side of the first prism holder PSMHa, a first driving magnet DMa coupled to a rear side of the first yoke Yka and a plurality of protrusions protruded toward the first prism holder PSMHa. Each of the protrusions may include an opening portion HSSa, and the opening portion HSSa may include a first coil holder CLHa for limiting the first rotation axis Axma.

A first driving coil DCLa may be disposed between the first coil holder CLHa and the first yoke Yka, and the first prism PSMa holder may include a plurality of bosses BSSa coupled with an opening of a plurality of protrusions so as to rotate the first prism PSMa around the first rotation axis Axma.

Meanwhile, the driving magnet DMa and the dirving coil DCLa in the first prism module 692a may construct the first rotational actuator ACTa.

For example, in order to compensate the first directional movement between the first directional movement and the second directional movement detected by the motion sensor 145, particularly, the gyro sensor 145c shown in FIG. 3C or FIG. 3D, the driving processor DRC may output the first control signal Saca to the first actuator ACTa in the first prism module 692a.

The first actuator ACTa, based on the first control signal Saca, may change an angle of the first prism PSMa along the first rotation axis.

Particularly, based on the first control signal Saca applied to the driving coil DCLa in the first actuator ACTa, the first actuator ACTa may change an angle of the first prism PSMa along the first rotation axis.

Meanwhile, the first Hall sensor HSa may sense magnetic field change according to the movements of the first prism PSMa in order to check movement information. Particularly, the first Hall sensor HSa may detect an angle change of the first prism PSMa based on first magnetic field.

Furthermore, the movement information detected by the first Hall sensor HSa, particularly, the first magnetic field change information Shsa may be input to the driving processor DRC.

The driving processor DRC may perform PI control and the like based on the control signal Saca for movement compensation and the movement information, particularly, the first magnetic field change information Shsa, and accordingly, may control movements of the first prism PSMa precisely.

That is, the driving processor DRC may receive the information Shsa detected by the first Hall sensor HSa and may perform a closed loop control, and accordingly, may control the movement of the first prism PSMa precisely.

Accordingly, the driving magnet DMa, the prism holder PSMHa and the prism PSMa may be rotated around the first rotation axis Axa.

Meanwhile, the coil holder CLHa, the driving coil DCLa and the Hall sensor HSa may not be rotated around the first rotation axis Axa, but fixed.

As such, a part of units in the first prism module 692a is rotated and a part of units in the first prism module 692a is fixed and based on the magnetic field signal sensed in the Hall sensor HSa, a hand tremor is sensed. In order to compensate the hand tremor, the driving magnet DMa is rotated and accordingly, the prism PSMa may be rotated. Therefore, a hand tremor compensation for the first direction may be precisely performed.

Meanwhile, in describing with reference to FIG. 8, the second prism module 692b may include the prism PSMb, a second prism holder PSMHb for fixing the second prism PSMb, a second yoke Yka coupled to a rear side of the second prism holder PSMHb, a second driving magnet DMb coupled to a rear side of the second yoke Ykb and a plurality of protrusions protruded toward the second prism holder PSMHb. Each of the protrusions may include an opening portion HSSa, and the opening portion HSSa may include a second coil holder CLHb for limiting the second rotation axis Axmb.

A second driving coil DCLb may be disposed between the second coil holder CLHb and the second yoke Ykb, and the second prism PSMb holder may include a plurality of bosses BSSb coupled with an opening of a plurality of protrusions so as to rotate the second prism PSMb around the second rotation axis Axmb.

Meanwhile, the driving magnet DMb and the dirving coil DCLb in the second prism module 692b may construct the second rotational actuator ACTb.

For example, in order to compensate the first directional movement between the first directional movement and the second directional movement detected by the motion sensor 145, particularly, the gyro sensor 145c shown in FIG. 3C or FIG. 3D, the driving processor DRC may output the second control signal Sacb to the second actuator ACTb in the second prism module 692b.

The second actuator ACTb, based on the second control signal Sacb, may change an angle of the second prism PSMb along the second rotation axis.

Particularly, based on the second control signal Sacb applied to the driving coil DCLb in the second actuator ACTb, the second actuator ACTb may change an angle of the second prism PSMb along the second rotation axis.

Meanwhile, the second Hall sensor HSb may sense magnetic field change according to the movements of the second prism PSMb in order to check movement information. Particularly, the second Hall sensor HSb may detect an angle change of the second prism PSMb based on second magnetic field.

Furthermore, the movement information detected by the second Hall sensor HSb, particularly, the first magnetic second change information Shsb may be input to the driving processor DRC.

The driving processor DRC may perform PI control and the like based on the control signal Sacab for movement compensation and the movement information, particularly, the first magnetic field change information Shsb, and accordingly, may control movements of the second prism PSMb precisely.

That is, the driving processor DRC may receive the information Shsb detected by the second Hall sensor HSb and may perform a closed loop control, and accordingly, may control the movement of the second prism PSMb precisely.

Accordingly, the driving magnet DMb, the prism holder PSMHb and the prism PSMb may be rotated around the second rotation axis Axb.

Meanwhile, the coil holder CLHb, the driving coil DCLb and the Hall sensor HSb may not be rotated around the second rotation axis Axb, but fixed.

As such, a part of units in the second prism module 692b is rotated and a part of units in the second prism module 692b is fixed and based on the magnetic field signal sensed in the Hall sensor HSb, a hand tremor is sensed. In order to compensate the hand tremor, the driving magnet DMb is rotated and accordingly, the prism PSMb may be rotated. Therefore, a hand tremor compensation for the second direction may be precisely performed.

For example, as shown in FIG. 7, by a hand tremor of a user, in the case that the first prism PSMa is rotated in clockwise direction CCW based on the first rotation axis Axa, for the hand tremor compensation, the driving processor DRC may control the first prism PSMa and the first sensor magnet SMa is rotated in counter clockwise direction CCW using the first rotational actuator ACTa, particularly, the first driving magnet DMa and the first driving coil DCLa.

Particularly, in the case that the first control signal Saca from the driving processor DRC is applied to the first driving coil DCLa in the first actuator ACTa, Lorentz's force is generated between the first driving coil DCLa and the first driving magnet DMa, the first driving magnet DMa may rotate in counter clockwise direction CCW.

In this case, the first Hall sensor HSa may detect change of magnetic field changed by the rotation in counterclockwise direction CCW of the first sensor magnet SMa.

Furthermore, the driving processor DRC performs a closed loop control based on the information Shsa detected in by the first Hall sensor HSa, and accordingly, the rotation in counterclockwise direction CCW of the first driving magnet DMa may be controlled more precisely.

For another example, as shown in FIG. 7, by a hand tremor of a user, in the case that the second prism PSMb is rotated in clockwise direction CW based on the second rotation axis Axb, for the hand tremor compensation, the driving processor DRC may control the second prism PSMb and the second sensor magnet SMb is rotated in counter clockwise direction CCW using the second rotational actuator ACTb, particularly, the second driving magnet DMb and the second driving coil DCLb.

Particularly, in the case that the second control signal Sacb from the driving processor DRC is applied to the second driving coil DCLb in the second actuator ACTb, Lorentz's force is generated between the second driving coil DCLb and the second driving magnet DMb, the second driving magnet DMb may rotate in counter clockwise direction CCW.

In this case, the second Hall sensor HSb may detect change of magnetic field changed by the rotation in counterclockwise direction CCW of the second sensor magnet SMb.

Furthermore, the driving processor DRC performs a closed loop control based on the information Shsb detected in by the second Hall sensor HSb, and accordingly, the rotation in counterclockwise direction CCW of the second driving magnet DMb may be controlled more precisely.

As such, the first prism module 692a and the second prism module 692b may be driven independently based on the respective first rotation axis Axa and the second rotation axis Axb according to the hand tremor movement. Therefore, the hand tremor compensation for a plurality of directions may be performed rapidly and precisely.

Meanwhile, when the first prism PSMa moves in a first angle θ1 in a first direction of the first rotation axis Axa, the first actuator ACTa may change the first prism PSMa in a second angle θ2, which is a half of the first angle θ1, in a second direction opposite to the first direction. Accordingly, although the hand tremor movement of the user, the movement compensation is performed with an angle smaller than the movement, and precise hand tremor compensation becomes available. In addition, the power consumption is also decreased.

Meanwhile, when the second prism PSMb moves in a third angle θ3 in a third direction of the second rotation axis Axb, the second actuator ACTb may change the second prism PSMb in a fourth angle θ4, which is a half of the third angle θ3, in the fourth direction opposite to the third direction. Accordingly, although the hand tremor movement of the user, the movement compensation is performed with an angle smaller than the movement, and precise hand tremor compensation becomes available. In addition, the power consumption is also decreased. This is described with reference to FIG. 9A to FIG. 9C below.

Figure 9A:
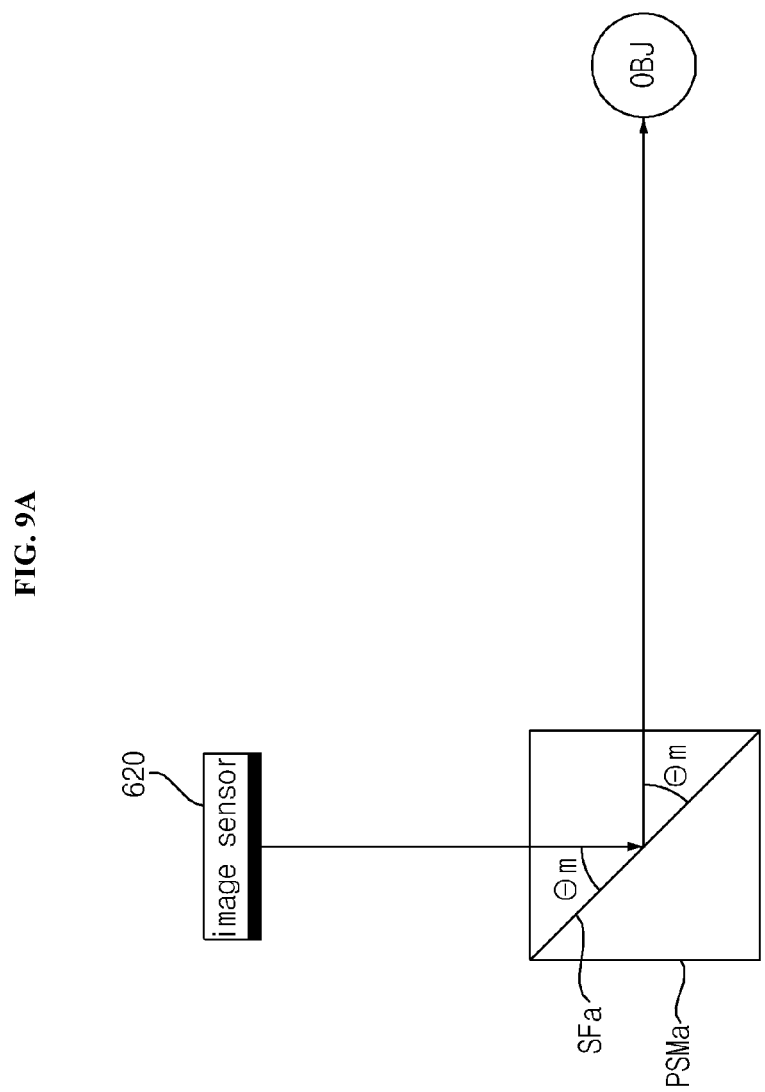
Figure 9B:
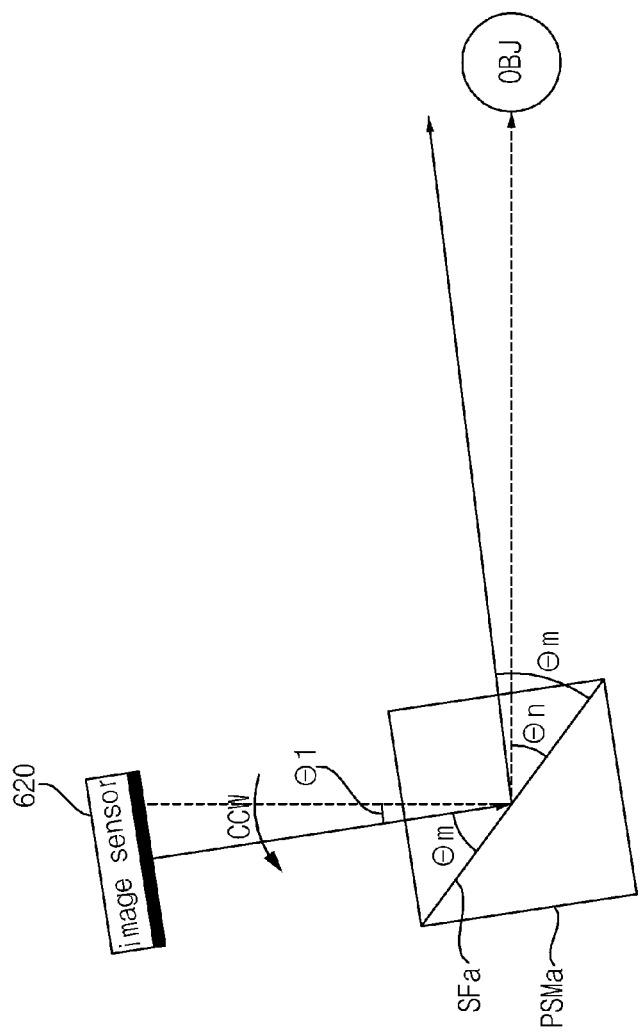
Figure 9C:
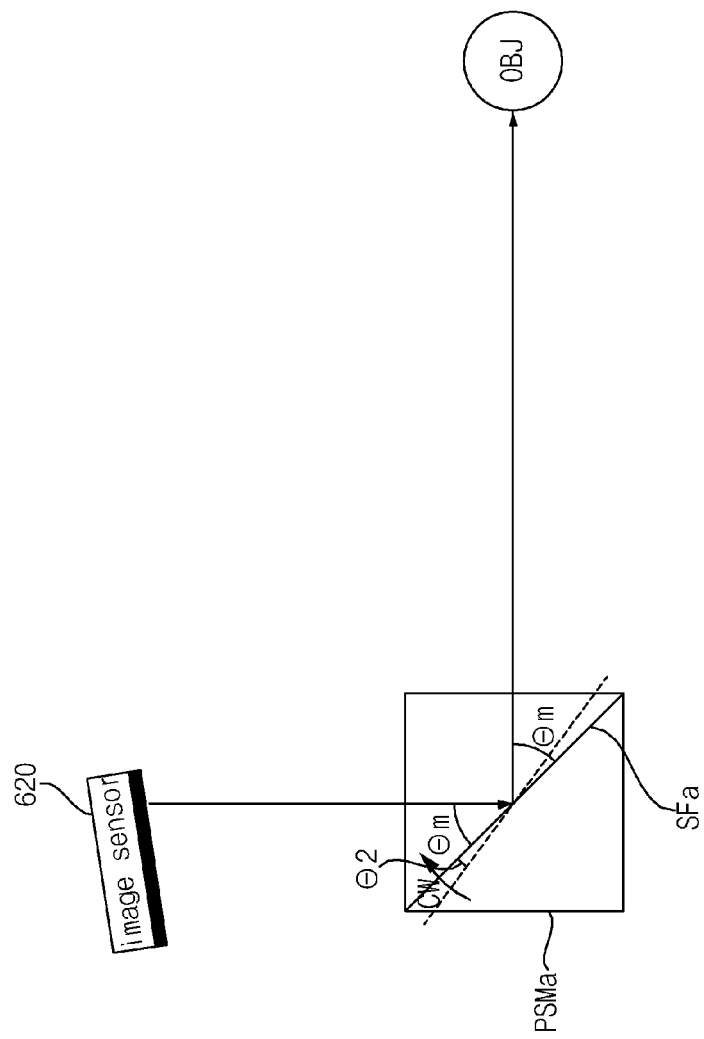

FIGS. 9A to 9C are diagrams referred to describe a hand tremor movement and a compensation according to the hand tremor movement.

Hereinafter, for the convenience of description, it is described the image sensor 620, the first prism PSMa and a front object OBL.

First, FIG. 9A illustrates the first prism PSMa disposed between the front object OBL and the image sensor 620 is fixed, in the case that there is no hand tremor of a user.

According to FIG. 9A, an angle between the image sensor 620 and a reflective surface SFa of the first prism PSMa is θm, and an angle between the reflective surface SFa of the first prism PSMa and the front object OBL is also θm. Here, θm may be about 45 degree.

According to this, the image sensor 620 may capture light for the front object OBL through the light incident by being reflected on the reflective surface SFa of the first prism PSMa and may change it to an electronic signal. Accordingly, an image transformation for the front object OBL becomes available.

Next, FIG. 9B illustrates that the first prism PSMa disposed between the front object OBL and the image sensor 620 is rotated by the first angle θ1 in counterclockwise direction CCW in the case that a hand tremor of a user is generated by the first angle θ1 in counterclockwise direction CCW.

According to FIG. 9B, an angle between the image sensor 620 and a rotated reflective surface SFa of the first prism PSMa is θm, but an angle between the reflective surface SFa of the first prism PSMa and the front object OBL is θn, which is smaller than θm.

In other words, the angle between the image sensor 620 and the rotated reflective surface SFa of the first prism PSMa is θm, and the front object OBL is not located in the direction of θm angle from the reflective surface SFa of the rotated first prism PSMa. Therefore, the image sensor 620 may not capture light for the front object OBL through the light incident by being reflected on the reflective surface SFa of the first prism PSMa.

Accordingly, the first actuator ACTa may rotate the first prism in clockwise direction cw with the second angle θ2, which is a half of the first angle θ1.

FIG. 9C illustrates that the first actuator ACTa may rotate the first prism in clockwise direction cw by the second angle θ2, which is a half of the first angle θ1 for a hand tremor prevention of a user.

Accordingly, as shown in FIG. 9A again, an angle between the image sensor 620 and a rotated reflective surface SFa of the first prism PSMa is θm, and an angle between the rotated reflective surface SFa of the first prism PSMa and the front object OBL is also θm.

According to this, the image sensor 620 may capture light for the front object OBL through the light incident by being reflected on the reflective surface SFa of the first prism PSMa and may change it to an electronic signal. Accordingly, even in the case that a hand tremor occurs, an image transformation for the front object OBL becomes available stably, through the hand tremor compensation.

Figure 10:
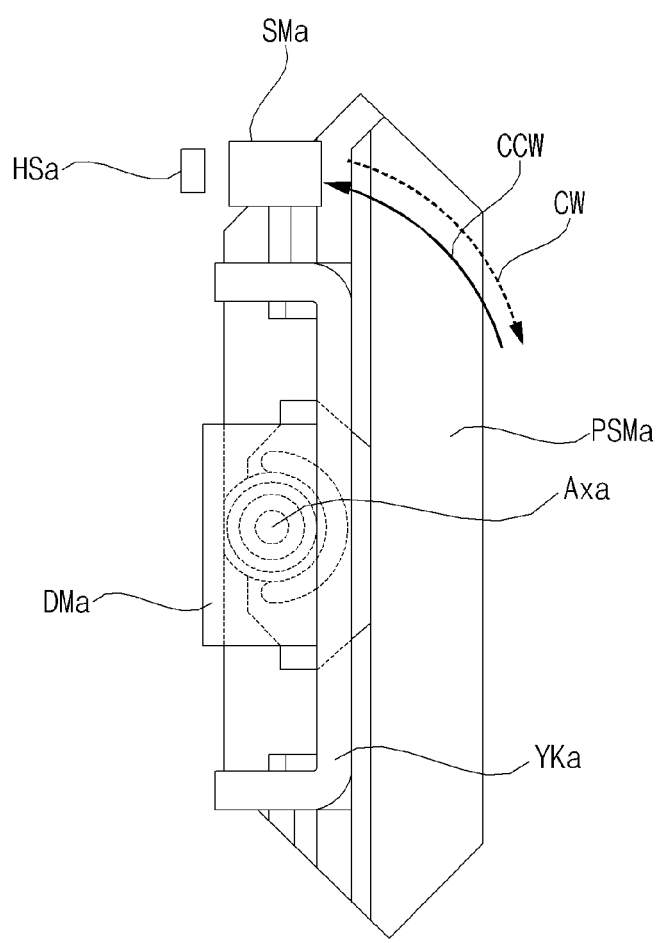

FIG. 10 is a diagram of the first prism module 692a of FIG. 6A to FIG. 7 viewed in a bottom direction from a top side.

According to the prism module 692a of FIG. 10, a prism PSMa is disposed on a first surface of a prism holder PSMHa, and a yoke Yka is disposed on a second surface, which is a rear surface of the first surface. Particularly, on the second surface of the prism holder PSMHa, the first surface of the yoke Yka may be disposed.

Meanwhile, a sensor magnet SMa is disposed at an upper side of the yoke Yka, and a Hall sensor Hsaz may be disposed with being spaced apart from the sensor magnet SMa.

That is, in the state that a rotation axis AXa is located in upper and lower directions, the yoke Yka is disposed around the rotation axis AXa, the sensor magnet SMa is disposed with being spaced apart from the yoke Yka, and the Hall sensor Hsa may be disposed with being spaced apart from the sensor magnet SMa.

In this case, based on the rotation axis AXa, the separation distances become greater in the order of the yoke Yka, the sensor magnet SMa and the Hall sensor Hsa.

Meanwhile, the yoke Yka and the sensor magnet SMa may be spaced apart in a vertical direction of the ground surface, and the sensor magnet SMa and the Hall sensor Hsa may be spaced apart in a horizontal direction of the ground surface.

That is, the separation direction between the yoke Yka and the sensor magnet SMa may intersect with the separation direction between the sensor magnet SMa and the Hall sensor Hsa.

Meanwhile, various modification is available for the position of the Hall sensor Hsa and the sensor magnet SMa.

In this case, as described in the description of FIG. 6A to FIG. 8, by a hand tremor of a user, in the case that the first prism PSMa is rotated in first clockwise direction CCW based on the first rotation axis Axa, for the hand tremor compensation, the driving processor DRC may control the first prism PSMa and the first sensor magnet SMa is rotated in counter clockwise direction CCW using the first rotational actuator, particularly, the first driving magnet DMa and the first driving coil.

Particularly, in the case that the first control signal Saca from the driving processor DRC is applied to the first driving coil DCLa in the first actuator ACTa, Lorentz's force is generated between the first driving coil DCLa and the first driving magnet DMa, the first driving magnet DMa may rotate in counter clockwise direction CCW.

In this case, the first Hall sensor HSa may detect change of magnetic field changed by the rotation in counterclockwise direction CCW of the first sensor magnet SMa.

Meanwhile, in the case that a range of the rotational angle according to the hand tremor is about 10 degree to −10 degree, the angle compensation range by the rotation in counterclockwise direction CCW may be about 5 degree to −5 degree, which is a half of the range of the rotational angle in clockwise direction CW according to the hand tremor.

Meanwhile, according to FIG. 10, even in the case that the rotational angle in clockwise direction CW becomes smaller since the hand tremor is small, an accurate detection is available in the Hall sensor Hsa, and consequently, an accuracy of the angle compensation for rotation in counterclockwise direction CCW may be improved.

Meanwhile, the description of FIG. 10 is described based on the first prism module 692a between the first prism module 692a and the second prism module 692b of FIG. 6A to FIG. 8, and applicable to the first prism module 692a, but not limited thereto, and also applicable to the second prism module 692b.

Meanwhile, the camera 500a shown in FIG. 5A and the camera 600 shown in FIG. 6A may obtain images based on different focuses.

Figure 11A:
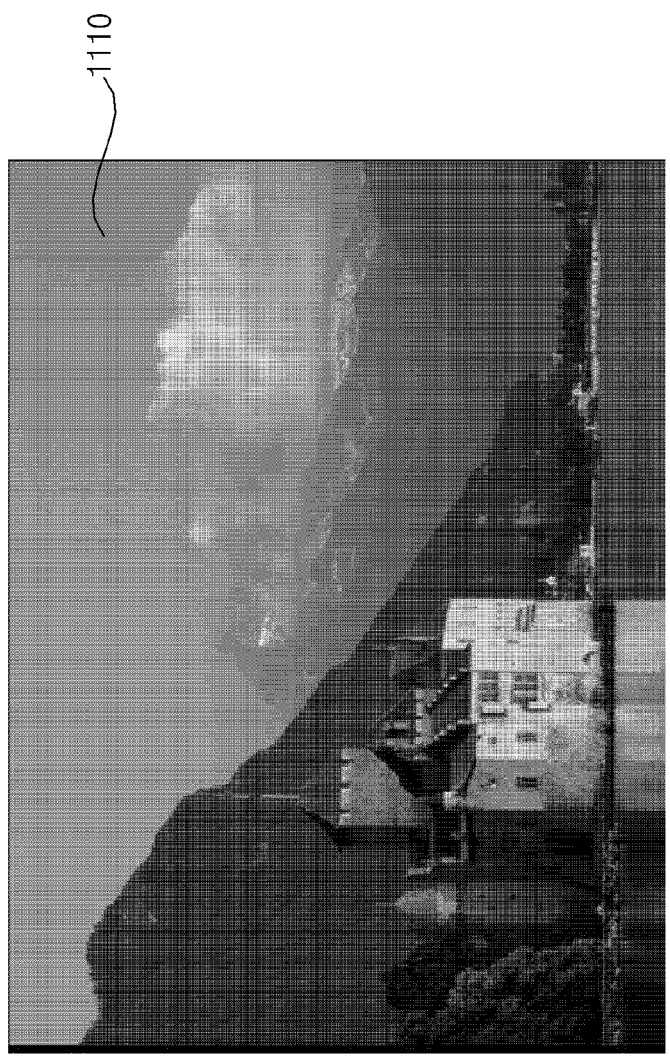
FIGS. 11A to 11C are diagrams referred for description of an operation of a camera according to an embodiment of the present disclosure.
Figure 11B:
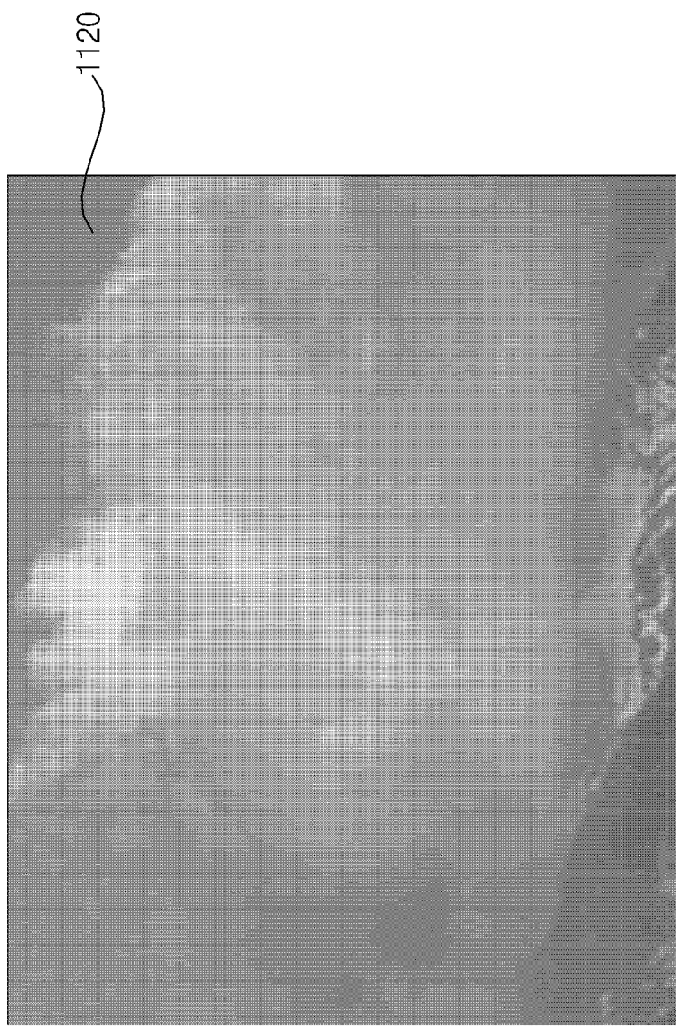
Figure 11C:
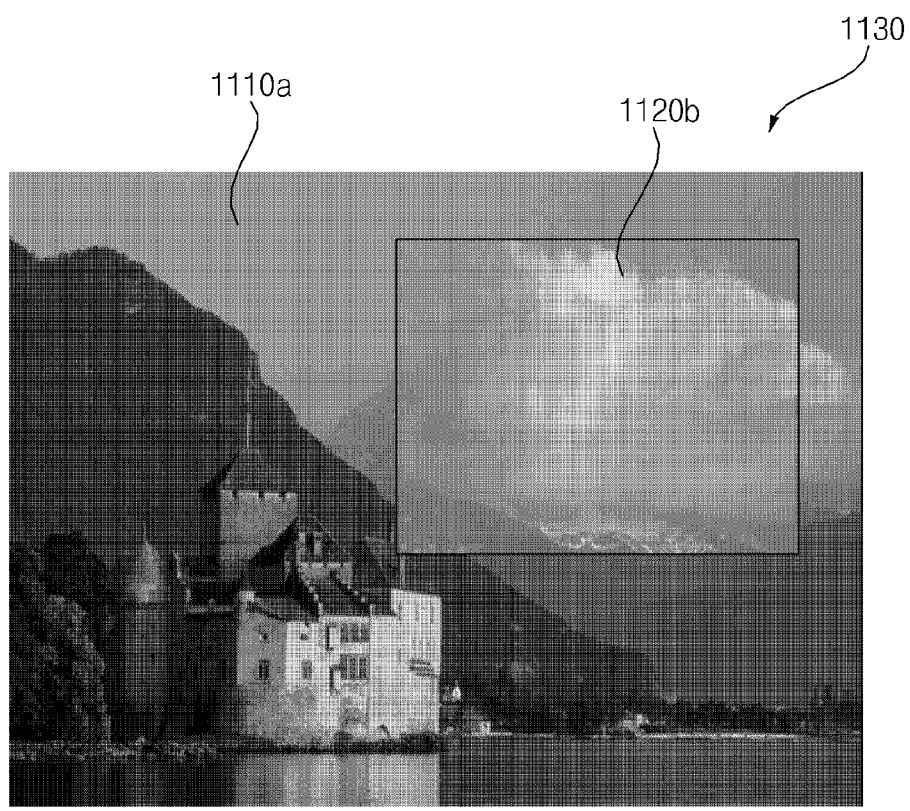

FIGS. 11A to 11C are diagrams referred for description of an operation of a camera according to an embodiment of the present disclosure.

First, FIG. 11A illustrates a first image 1110 based on a first focus obtained from the camera 500a or 600 at a first time. In this case, the first image 1110 may be an image of a first magnification.

Next, FIG. 11B illustrates a second image 1120 based on a second focus obtained from the camera 500a or 600 at a second time.

In this case, a second focal length may be closer than a first focal length, and accordingly, the second image 1120 may be an image of a second magnification, which is higher than the first magnification.

Next, FIG. 11C illustrates a third image 1130 that synthesizes the first image 1110 at the first time and the second image 1120 at the second time.

The processor 170 in the camera 500a or 600 may control to output the third image 1130 that synthesizes the first image 1110 at the first time and the second image 1120 at the second time.

In the drawing, it is illustrated that a second image area 1120b is overlapped on a first image area 1110a, within the third image 1130.

As such, on various times, the electric signal applied to the micro mirror array (MMA) is varied, and an image of various focuses may be obtained and displayed. Accordingly, a user convenience may be increased.

Meanwhile, the camera 500a or 600 provided with the micro mirror array (MMA) described in FIG. 5A to FIG. 11C may be applied to various terminals. For example, the camera 500a or 600 provided with the micro mirror array (MMA) described in FIG. 5A to FIG. 11C may be adopted to various electronic devices such as the mobile terminal 100 of FIG. 2, a vehicle, a TV, a drone, a robot, a robot cleaner and a door.

In addition, the preferred embodiment of the present disclosure is described so far, but the present disclosure is not limited to a specific embodiment described above. And various modifications of the present disclosure is also available to those skilled in the art without departing from the concept of the present disclosure claimed in the claims, and such various modifications should not be individually understood from the inventive concept or prospect of the present disclosure.

What is claimed is:

1. A camera comprising:
a lens structure including a micro mirror array;
a processor configured to output a curvature control signal for a curvature variation to the micro mirror array in the lens structure;
a first prism for reflecting incident light in a first reflection direction;
a first actuator for changing the first reflection direction by changing an angle of the first prism around a first rotation axis based on a first control signal which is input;
a first prism holder for fixing the first prism;
a plurality of protrusions protruded toward the first prism holder, wherein each of the protrusions includes an opening portion, and wherein the opening portion includes a first coil holder for limiting the first rotation axis; and
a first yoke coupled to a rear side of the first prism holder, wherein the first actuator comprises:
a first driving magnet coupled to a rear side of the first yoke; and
a first driving coil disposed between the first coil holder and the first yoke,
wherein the first prism holder includes a plurality of bosses coupled with an opening of the plurality of protrusions to rotate the first prism around the first rotation axis,
wherein the micro mirror array includes a plurality of micro mirrors,
wherein a first tilting angle of a first micro mirror and a second tilting angle of a second micro mirror among the plurality of micro mirrors are changed based on the curvature control signal, and
wherein the second micro mirror is closer to an outside than the first micro mirror, and the second tilting angle is greater than the first tilting angle.

2. The camera of claim 1, wherein the plurality of micro mirrors is arranged in a plurality of concentric circles.

3. The camera of claim 1, wherein the processor is configured to:
output a first curvature control signal to the micro mirror array at a first time to form a first focus, and
output a second curvature control signal to the micro mirror array at a second time after the first time to form a second focus.

4. The camera of claim 3, wherein, when the tilting angle of the micro mirror array is greater at the second time than the tilting angle of the micro mirror array at the first time, the second focus is formed closer than the first focus.

5. The camera of claim 1, further comprising:
a second prism for reflecting the light reflected from the first prism in a second reflection direction; and
a second actuator for changing the second reflection direction by changing an angle of the second prism around a second rotation axis based on a second control signal which is input.

6. The camera of claim 5, wherein a first output prism surface of the first prism faces a second incident prism surface of the second prism.

7. The camera of claim 5, wherein the first rotation axis of the first prism is orthogonal to the second rotation axis of the second prism.

8. The camera of claim 5, wherein, in response to a movement causing rotation of the first prism around the first rotation axis by a first angle and rotation of the second prism around the second rotation axis by a second angle,
the first actuator is configured to rotate the first prism in a third direction opposite to the first direction by a third angle in response to the first control signal,
the second actuator is configured to rotate the second prism in a fourth direction opposite to the second direction by a fourth angle in response to the second control signal,
wherein the third angle is a half of the first angle, and
wherein the fourth angle is a half of the second angle.

9. The camera of claim 5, further comprising:
a first Hall sensor for detecting an angle change of the first prism based on first magnetic field, and
a second Hall sensor for detecting an angle change of the first second prism based on second magnetic field.

10. The camera of claim 5, wherein the second actuator includes a second driving magnet and a second driving coil.

11. The camera of claim 10, further comprising:
a second prism holder for fixing the second prism;
a second yoke coupled to a rear side of the second prism holder;
a second driving magnet coupled to a rear side of the second yoke; and
a plurality of protrusions protruded toward the second prism holder, wherein each of the protrusions protruded toward the second prism holder includes an opening portion, and wherein the opening portion includes a second coil holder for limiting the second rotation axis,
wherein a second driving coil is disposed between the second coil holder and the second yoke, and
wherein the second prism holder includes a plurality of bosses coupled with an opening of the plurality of protrusions protruded toward the second prism holder to rotate the second prism around the second rotation axis.

12. The camera of claim 5, further comprising an image sensor for generating an image signal based on the light output from the lens structure.

13. The camera of claim 12, further comprising:
a gyro sensor for detecting a movement of the camera, and
wherein the processor controls the first reflection direction by changing an angle of the first prism around the first rotation axis and controls the second reflection direction by changing an angle of the second prism around the second rotation axis, based on movement information.

14. A terminal, comprising:
a camera; and
a controller configured to control the camera,
wherein the camera comprises:
a lens structure including a micro mirror array;
a processor configured to output a curvature control signal for a curvature variation to the micro mirror array in the lens structure;
a first prism for reflecting incident light in a first reflection direction;
a first actuator for changing the first reflection direction by changing an angle of the first prism around a first rotation axis based on a first control signal which is input;
a first prism holder for fixing the first prism;
a plurality of protrusions protruded toward the first prism holder, wherein each of the protrusions includes an opening portion, and wherein the opening portion includes a first coil holder for limiting the first rotation axis; and
a first yoke coupled to a rear side of the first prism holder,
wherein the first actuator comprises:
a first driving magnet coupled to a rear side of the first yoke; and
a first driving coil disposed between the first coil holder and the first yoke,
wherein the first prism holder includes a plurality of bosses coupled with an opening of the plurality of protrusions to rotate the first prism around the first rotation axis,
wherein the micro mirror array includes a plurality of micro mirrors,
wherein a first tilting angle of a first micro mirror and a second tilting angle of a second micro mirror among the plurality of micro mirrors are changed based on the curvature control signal, and
wherein the second micro mirror is closer to an outside than the first micro mirror, and the second tilting angle is greater than the first tilting angle.

15. The terminal of claim 14, wherein the processor is controlled to output a third image that synthesizes a first image based on a first focus obtained from the camera at a first time and a second image based on a second focus obtained from the camera at a second time.

16. The terminal of claim 14, wherein the processor is configured to:
output a first curvature control signal to the micro mirror array at a first time to form a first focus, and
output a second curvature control signal to the micro mirror array at a second time after the first time to form a second focus.

17. The terminal of claim 14, wherein the camera further comprises:
a second prism for reflecting the light reflected from the first prism in a second reflection direction; and
a second actuator for changing the second reflection direction by changing an angle of the second prism around a second rotation axis based on a second control signal which is input.

18. The terminal of claim 17, wherein, in response to a movement causing rotation of the first prism around the first rotation axis by a first angle and rotation of the second prism around the second rotation axis by a second angle,
- the first actuator is configured to rotate the first prism in a third direction opposite to the first direction by a third angle in response to the first control signal,
- the second actuator is configured to rotate the second prism a fourth direction opposite to the second direction by a fourth angle in response to the second control signal, wherein the third angle is a half of the first angle, and
wherein the fourth angle is a half of the second angle.

* * * * *